United States Patent
Riedel et al.

(10) Patent No.: US 11,954,228 B2
(45) Date of Patent: *Apr. 9, 2024

(54) SYSTEMS AND METHODS FOR PROVIDING IDENTITY VERIFICATION SERVICES

(71) Applicant: Civic Technologies, Inc., San Francisco, CA (US)

(72) Inventors: Martin Riedel, Berlin (DE); Jonathan R. Smith, Oakland, CA (US); Vinodan K. Lingham, Los Altos, CA (US); Llewellyn Claasen, Capetown (ZA); James A. G. Kilroe, Capetown (ZA); Kyle M. Levin, Capetown (ZA)

(73) Assignee: Civic Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,074

(22) Filed: Feb. 16, 2022

(65) Prior Publication Data

US 2022/0171877 A1   Jun. 2, 2022

Related U.S. Application Data

(63) Continuation of application No. 17/095,234, filed on Nov. 11, 2020, now Pat. No. 11,281,800, which is a
(Continued)

(51) Int. Cl.
*G06F 21/62* (2013.01)
*G06Q 10/10* (2023.01)
(Continued)

(52) U.S. Cl.
CPC ......... *G06F 21/6245* (2013.01); *G06Q 10/10* (2013.01); *G06Q 20/0655* (2013.01); *G06Q 20/363* (2013.01); *G06Q 20/3674* (2013.01); *G06Q 20/3829* (2013.01); *G06Q 20/389* (2013.01); *G06Q 30/0185* (2013.01); *G06Q 50/265* (2013.01); *H04L 63/0853* (2013.01);
(Continued)

(58) Field of Classification Search
CPC ............... G06F 21/6245; G06Q 10/10; G06Q 20/0655; G06Q 20/363; G06Q 20/3674; G06Q 20/3829; G06Q 20/389; G06Q 30/0185; G06Q 50/265; G06Q 40/03; G06Q 2220/00; G06Q 30/02; G06Q 10/06; H04L 63/0853
USPC .......................................................... 726/6
See application file for complete search history.

(56) References Cited

U.S. PATENT DOCUMENTS 9,667,427 B2   5/2017  Oberhauser et al.
2007/0179802 A1   8/2007  Buss et al.
(Continued)

OTHER PUBLICATIONS

European Examination Report issued in European Patent Application No. 19733576.3, dated Sep. 30, 2022.

*Primary Examiner* — Jeffrey C Pwu
*Assistant Examiner* — Nega Woldemariam
(74) *Attorney, Agent, or Firm* — Volpe Koenig P.C.

(57) ABSTRACT

Systems and methods for providing identity verification services to users by providing a staking mechanism to incentivize participants in an identity verification system to be truthful and accurate and determining validator accuracy and associated setting of fees for using validator attestations to create an efficient, private and secure system.

14 Claims, 17 Drawing Sheets

Related U.S. Application Data continuation of application No. PCT/US2019/031891, filed on May 10, 2019.

(60) Provisional application No. 62/670,671, filed on May 11, 2018, provisional application No. 62/670,669, filed on May 11, 2018, provisional application No. 62/670,667, filed on May 11, 2018, provisional application No. 62/670,666, filed on May 11, 2018.

(51) Int. Cl.
*G06Q 20/06* (2012.01)
*G06Q 20/36* (2012.01)
*G06Q 20/38* (2012.01)
*G06Q 30/018* (2023.01)
*G06Q 50/26* (2012.01)
*H04L 9/40* (2022.01)
*G06Q 40/03* (2023.01)

(52) U.S. Cl.
CPC ......... *G06Q 40/03* (2023.01); *G06Q 2220/00* (2013.01)

(56) References Cited

U.S. PATENT DOCUMENTS

| | | |
|---|---|---|
| 2014/0344084 A1 | 11/2014 | Rothchild |
| 2015/0356523 A1 | 12/2015 | Madden |
| 2017/0316390 A1 | 11/2017 | Smith et al. |
| 2019/0222575 A1* | 7/2019 | Oberhauser ............ G07C 9/32 |
| 2020/0351083 A1* | 11/2020 | Bartolucci ............ H04L 9/3239 |

* cited by examiner

| Level | P |
|---|---|
| 10,000 | 99.99% |
| 1,000 | 99.90% |
| 100 | 99.00% |
| 13.52 | 92.60% |
| 2.5 | 60.00% |

Recording an attestation of information of a user at an attestation address determined based on the information of the user
1310

Receiving from each of a plurality of requesting devices a first predetermined number of tokens responsive to the requesting devices accessing the attestation at the attestation address
1320

Receiving from a requesting device a request indicating that the attestation may be invalid
1330

Providing to the requesting device(s) a second predetermined number of tokens which is less than the first predetermined number of tokens
1340

Providing to the other requesting devices a portion of a third predetermined number of tokens that is proportional to a trust level or number of flagging requesting devices
1350

```
┌─────────────────────────────────────────────┐
│ Recording one or more attestations of       │
│ information of users at attestation         │
│ addresses determined based on the           │
│ information of the users, each attestation  │
│ assigned a trust level proportional to the  │
│ probability that the attestation is         │
│ correct                                     │
│ 1410                                        │
└─────────────────────────────────────────────┘
                     │
                     ▼
┌─────────────────────────────────────────────┐
│ Determining a stake value based on an       │
│ average trust level of a number of recorded │
│ attestations                                │
│ 1420                                        │
└─────────────────────────────────────────────┘
                     │
                     ▼
            ╱ Determining if ╲
   Yes    ╱  the stake value is above or  ╲   No
 ◄───────╲   equal to a threshold?        ╱───────►
          ╲         1425                 ╱
           ╲                            ╱
    │                                         │
    ▼                                         ▼
┌──────────────────────────┐    ┌─────────────────────────┐
│ Providing to a different │    │ Not continuing with the │
│ device a number of tokens│    │ interaction             │
│ that is at least as many │    │ 1440                    │
│ as the determined stake  │    │                         │
│ value                    │    │                         │
│ 1430                     │    │                         │
└──────────────────────────┘    └─────────────────────────┘
```

FIG. 14

SYSTEMS AND METHODS FOR PROVIDING IDENTITY VERIFICATION SERVICES

RELATED APPLICATIONS

This application claims the benefit of and priority as a continuation to U.S. patent application Ser. No. 17/095,234, entitled "Systems and Methods for Providing Identity Verification Services," filed Nov. 11, 2020; which claims priority as a national stage application under 35 U.S.C. § 371 to International Patent Application No. PCT/US2019/031891, entitled "Rewards and Penalties of the Reward Function for the Attestation Game," filed May 10, 2019; which claims priority to U.S. Provisional Application No. 62/670,666, entitled "Rewards and Penalties of the Reward Function for the Attestation Game," filed May 11, 2018; and U.S. Provisional Application No. 62/660,667, entitled "Validator Accuracy and Levels and Rate Limiting Requester Flagging in a Identity Verification System," filed May 11, 2018; and U.S. Provisional Application No. 62/670,669, entitled "Overcoming Disconnected Utility in an Identity Verifications System," filed May 11, 2018; and U.S. Provisional Application No. 62/670,671, entitled "Staking Mechanisms in an Identity Verification System," filed May 11, 2018, the entirety of each of which is incorporated by reference herein.

FIELD OF THE DISCLOSURE

The present disclosure generally relates to systems and methods for providing identity verification services to users by providing a staking mechanism to incentivize participants in an identity verification system to be truthful and accurate and determining validator accuracy and associated setting of fees for using validator attestations to create an efficient, private and secure system.

BACKGROUND

The present invention generally relates to systems and methods for providing identity verification services to users by providing a staking mechanism to incentivize participants in an identity verification system to be truthful and accurate and determining validator accuracy and associated setting of fees for using validator attestations to create an efficient, private and secure system.

Banks and financial institutions may be required to verify the identity of a customer and to verify the authenticity of information provided by that customer when the customer seeks access to a new product or service, for example when opening a new account or applying for a loan. This trend has quickly spilled over into other sectors, particularly considering the rise in e-commerce and our increasingly digital lives. A result of this trend is that digitized personal information is constantly increasing, as are security breaches and data theft.

The ability to store and share information digitally offers many benefits, and the digitization of data has increasingly grown. However, alongside the advantages of cost and convenience, the ability to copy and share data has raised questions about the security and privacy of personal data. There have been many high-profile hacks, leaks, and theft of personal information, as well as cases where unencrypted data has simply been lost or left vulnerable to theft. In 2016 alone, 15.4 million adults in the U.S. were victims of identity fraud, an increase of 16% over 2015, and victims suffered losses amounting to $16 billion. Personal identifiable information (PII) was the most common form of data stolen, accounting for almost 43% of data breaches, and the services industry was most affected by data breaches, accounting for almost double the occurrence of the finance, insurance, and real estate sectors combined.

Inefficiencies in the identity verification industry have both financial and social costs. Without proof of identity, an individual may be unable to exercise a range of legal rights, including the ability to vote, access health care, and receive social welfare. Lack of identity documentation and the high costs of obtaining it means that many individuals globally are wholly or partially denied access to banking facilities. In low-income countries, new births often go unregistered because parents struggle to acquire the necessary documentation to have verified and recorded reliably by the relevant authorities.

In addition to identity verification processes often being intrusive or time-consuming to consumers, they come at a significant cost to the financial institutions required to carry them out as a matter of law and to avoid commercial losses due to fraud. It may cost a financial institution such as a bank $15 or more to on-board a single customer and verify their identity and personal information. This process gets repeated every time the same consumer tries to access another product or service, despite the process being similar, if not identical, for most organizations. The time it takes to initially validate information has a detrimental impact on customer relations and invariably also impacts customer acquisition and conversion rates for the sales of products where verification of consumer identity or information is required. Consumers are forced to fill in lengthy application forms and provide extensive personal information, and institutions are being forced to collect sensitive data that they arguably don't need to transact with a customer.

The same overhead and inefficiencies are present in other sectors where highly sensitive data may need to be verified, including in background checks for employment. The sharing economy, which relies heavily on trust and on the verification of identity and personal information, grew an average of 32.4% per annum from 2014 to 2016 and now includes 27 million adults in the U.S., demonstrating the growth and scale driving demand for identity verification services beyond the financial sector.

An identity verification system manages trusted digital identities and enables the use of those trusted digital identities to facilitate interactions between people in society. Digital identities include a collection of attributes and their values which can be used to identity the entities of a system and allow those entities to make identity claims. Identity management includes many aspects including creation of an identity, validation of an identity, storage of the identity, maintenance and updates to the identity, and protection of the identity from theft and unauthorized use. Use of identities allow a person or a computer to recognize other entities involved in an interaction and based on that to determine a role, scope of access, scope of authorization, and scope of actions that an entity can perform.

The identity verification industry has grown in response to the changing cultural, societal, and regulatory landscape concerning personal data, and a number of service providers now offer easy API access to multiple sources of consumer data for identity verification purposes. This largely ad hoc approach has resulted in an outdated, costly, and inefficient system.

SUMMARY

The systems and methods discussed herein are an identity verification system for the providers of goods and services to implement while maintaining privacy and security of personal information of users or consumers. These systems and methods provide a transformative solution that allows individuals and organizations to easily, securely, and cost effectively obtain proof that identity verification information has been authenticated by a trusted institution without organizations sharing any PII between them, leveraging blockchain and smart contracts technology. A validator is someone who verifies the authenticity of PII and adds attestations to the ledger using an attestation address derived from the PII. A validator may be assigned a trust level based on the probability of correct attestations a validator might have. A validator might also have a stake value based on the trust level and a number of attestations it might have given. A validator provides verification of PII and records it via an attestation ledger at an address derived from the PII, with a number of tokens placed in escrow within a smart contract. Subsequently, a user may provide data to a requester to obtain the attestation ledger address and the requester checks the attestation ledger to confirm the validity of the information. A validator may be paid tokens for its correct attestations and penalized in tokens for its incorrect attestations in proportion to its trust level or stake value. If the requester is satisfied the PII is valid, tokens are released to the validator and the requester then interacts with a user.

In a first aspect, the present disclosure is directed to a method for feedback-driven attestation of information. The method includes recording, by a validating device in a distributed or centralized ledger, an attestation of information of a user with a transaction to an attestation address within the distributed or centralized ledger, the attestation address derived based on the information of the user. The method also includes receiving, by the validating device from a requesting device responsive to the requesting device accessing the transaction at the attestation address representing the attestation, a request indicating that the attestation may be invalid. The method also includes providing, by the validating device to the requesting device responsive to the request, a first predetermined number of tokens.

In some implementations, the method includes determining, by the validating device, whether to accept or reject the request indicating that the attestation may be invalid. In a further implementation, the first predetermined number of tokens is proportional to a ratio of previously accepted requests indicating that attestations may be invalid received from the requesting device to a total number of requests indicating that attestations may be invalid received from the requesting device. In another further implementation, the first predetermined number of tokens is selected from a first value, responsive to the validating device accepting the request, or a second value, responsive to the validating device rejecting the request. In a still further implementation, the first value exceeds the second value.

In some implementations, the method includes receiving a second predetermined number of tokens, by the validating device from the requesting device, responsive to the requesting device accessing the attestation by searching the transaction at the attestation address. In a further implementation, the first predetermined number of tokens exceeds the second predetermined number of tokens.

In another aspect, the present disclosure is directed to a system for feedback-driven attestation of information. The system includes a validating device in communication with a system maintaining a distributed or centralized ledger and a requesting device. The validating device comprises a processor configured to: record, in the distributed or centralized ledger, an attestation of information of a user with a transaction to an attestation address within the distributed or centralized ledger, the attestation address derived based on the information of the user; receive, from the requesting device responsive to the requesting device accessing the transaction at the attestation address representing the attestation, a request indicating that the attestation may be invalid; and provide, to the requesting device responsive to the request, a first predetermined number of tokens.

In some implementations, the processor is further configured to determine whether to accept or reject the request indicating that the attestation may be invalid. In a further implementation, the first predetermined number of tokens is proportional to a ratio of previously accepted requests indicating that attestations may be invalid received from the requesting device to a total number of requests indicating that attestations may be invalid received from the requesting device. In another further implementation, the first predetermined number of tokens is selected from a first value, responsive to the validating device accepting the request, or a second value, responsive to the validating device rejecting the request. In a still further implementation, the first value exceeds the second value.

In some implementations, the processor is further configured to receive a second predetermined number of tokens, by the validating device from the requesting device, responsive to the requesting device accessing the attestation by searching the transaction at the attestation address. In a further implementation, the first predetermined number of tokens exceeds the second predetermined number of tokens.

In another aspect, the present disclosure is directed to a method for feedback-driven attestation of information. The method includes receiving, by a requesting device, information of a user. The method also includes accessing, by the requesting device, a transaction stored at an attestation address in a distributed or centralized ledger by a validating device, the attestation address derived based on the information of the user. The method also includes determining, by the requesting device, to flag the attestation as potentially invalid. The method also includes transmitting, by the requesting device to the validating device, a request indicating that the attestation may be invalid. The method also includes receiving, by the requesting device from the validating device responsive to the request, a first predetermined number of tokens.

In some implementations, the method includes receiving a first number of tokens, responsive to the validating device accepting the request, or a second number of tokens, responsive to the validating device rejecting the request, the first number of tokens exceeding the second number of tokens. In a further implementation, the first predetermined number of tokens is proportional to a ratio of previously accepted requests indicating that attestations may be invalid received from the requesting device to a total number of requests indicating that attestations may be invalid received from the requesting device.

In some implementations, the method includes providing, by the requesting device to the validating device, a second predetermined number of tokens responsive to accessing the transaction in the distributed or centralized ledger at the attestation address. In a further implementation, the first predetermined number of tokens exceeds the second predetermined number of tokens. In some implementations, the method includes deriving, by the requesting device, the attestation address from a hash of the information of the user.

In another aspect, the present disclosure is directed to a method for utilizing trust levels for attestation of information. The method includes recording, by a validating device in a distributed or centralized ledger, an attestation of information of a user with a transaction at an attestation address within the distributed or centralized ledger derived based on the information of the user, the validating device assigned a trust level proportional to a probability that the attestation is correct by an operator of the validating device. The method also includes receiving, by the validating device from a requesting device responsive to the requesting device accessing the transaction at the attestation address, a request indicating that the attestation may be invalid. The method also includes providing, by the validating device to the requesting device responsive to the request, a first predetermined number of tokens. The method also includes providing, by the validating device to a penalizing device, a second predetermined number of tokens, the second predetermined number of tokens selected proportional to the trust level assigned to the validating device.

In some implementations, the method includes receiving a third predetermined number of tokens, by the validating device from the requesting device, responsive to the requesting device accessing the transaction at the attestation address. In a further implementation, the third predetermined number of tokens is less than the second predetermined number of tokens. In another further implementation, the second predetermined number of tokens is equal to the third predetermined number of tokens divided by a value inversely proportional to the probability that the attestation is correct. In a still further implementation, the value inversely proportional to the probability that the attestation is correct comprises a difference between one and the probability that the attestation is correct multiplied by a weighting coefficient. In a yet still further implementation, the weighting coefficient is determined by the penalizing device. In another further implementation, the first predetermined number of tokens is proportional to the probability that the attestation is correct multiplied by the third predetermined number of tokens.

In some implementations, the validating device is a first validating device of a plurality of validating devices, each validating device assigned a trust level by an operator of the corresponding validating device, and a plurality of the assigned trust levels are different.

In another aspect, the present disclosure is directed to a system for utilizing trust levels for attestation of information. A validating device in communication with a system maintaining a distributed or centralized ledger and a requesting device. The validating device comprises a processor configured to: record an attestation of information of a user with a transaction at an attestation address within the distributed or centralized ledger derived based on the information of the user, the validating device assigned a trust level proportional to a probability that the attestation is correct by an operator of the validating device; receive, from the requesting device responsive to the requesting device accessing the transaction at the attestation address, a request indicating that the attestation may be invalid; provide, to the requesting device responsive to the request, a first predetermined number of tokens; and provide, to a penalizing device, a second predetermined number of tokens, the second predetermined number of tokens selected proportional to the trust level assigned to the validating device.

In some implementations, the processor is further configured to receive a third predetermined number of tokens, from the requesting device, responsive to the requesting device accessing the transaction at the attestation address. In a further implementation, the third predetermined number of tokens is less than the second predetermined number of tokens. In another further implementation, the second predetermined number of tokens is equal to the third predetermined number of tokens divided by a value inversely proportional to the probability that the attestation is correct. In a still further implementation, the value inversely proportional to the probability that the attestation is correct comprises a difference between one and the probability that the attestation is correct multiplied by a weighting coefficient. In a yet still further implementation, the weighting coefficient is determined by the penalizing device. In another further implementation, the first predetermined number of tokens is proportional to the probability that the attestation is correct multiplied by the third predetermined number of tokens.

In some implementations, the validating device is a first validating device of a plurality of validating devices, each validating device assigned a trust level by an operator of the corresponding validating device, and a plurality of the assigned trust levels are different.

In another aspect, the present disclosure is directed to a non-transitory computer readable medium comprising instructions that, when executed by a processor of a computing system, cause the computing system to: record an attestation of information of a user with a transaction at an attestation address within a distributed or centralized ledger derived based on the information of the user, the computing system assigned a trust level proportional to a probability that the attestation is correct by an operator of the computing system; receive, from a requesting device responsive to the requesting device accessing the transaction at the attestation address, a request indicating that the attestation may be invalid; provide, to the requesting device responsive to the request, a first predetermined number of tokens; and provide, to a penalizing device, a second predetermined number of tokens, the second predetermined number of tokens selected proportional to the trust level assigned to the validating device.

In some implementations, execution of the instructions cause the computing system to receive a third predetermined number of tokens, from the requesting device, responsive to the requesting device accessing the transaction at the attestation address. In a further implementation, the second predetermined number of tokens is equal to the third predetermined number of tokens divided by a value inversely proportional to the probability that the attestation is correct. In another further implementation, the first predetermined number of tokens is proportional to the probability that the attestation is correct multiplied by the third predetermined number of tokens.

In another aspect, the present disclosure is directed to a method for invalidating attestation of information. The method includes recording, by a validating device in a distributed or centralized ledger, an attestation of information of a user with a transaction at an attestation address within the distributed or centralized ledger derived based on the information of the user, the validating device assigned a trust level proportional to a probability that the attestation is correct by an operator of the validating device. The method also includes receiving, by the validating device from each of a plurality of requesting devices, a first predetermined number of tokens, responsive to the requesting device accessing the transaction at the attestation address. The method also includes subsequently receiving, by the validating device from a first requesting device of the plurality of requesting devices, a request indicating that the attestation may be invalid, responsive to the first requesting device accessing the transaction at the attestation address. The method also includes providing, by the validating device to the first requesting device responsive to the request, a second predetermined number of tokens, the second predetermined number of tokens less than the first predetermined number of tokens. The method also includes providing, by the validating device to each requesting device other than the first requesting device of the plurality of requesting devices, a portion of a third predetermined number of tokens, the third predetermined number of tokens selected proportional to the trust level assigned to the validating device.

In some implementations, the portion of the third predetermined number of tokens comprises a predetermined penalty number of tokens, minus the second predetermined number of tokens, divided by a number of requesting devices of the plurality of requesting devices other than the first requesting device. In some implementations, the third predetermined number of tokens is equal to the first predetermined number of tokens divided by a value inversely proportional to the probability that the attestation is correct. In a further implementation, the value inversely proportional to the probability that the attestation is correct comprises a difference between one and the probability that the attestation is correct multiplied by a weighting coefficient.

In some implementations, the second predetermined number of tokens is proportional to the probability that the attestation is correct multiplied by the first predetermined number of tokens. In some implementations, the portions of the third predetermined number of tokens are equal. In some implementations, the method includes recording invalidity of the attestation represented by the transaction at the attestation address within the distributed or centralized ledger, by the validating device, responsive to the request. In some implementations, the third predetermined number of tokens is at least ten times the first predetermined number of tokens.

In another aspect, the present disclosure is directed to a system for invalidating attestation of information. The system includes a validating device in communication with a system maintaining a distributed or centralized ledger. The validating device includes a processor configured to: record, in the distributed or centralized ledger, an attestation of information of a user with a transaction at an attestation address within the distributed or centralized ledger derived based on the information of the user, the validating device assigned a trust level proportional to a probability that the attestation is correct by an operator of the validating device; receive, from each of a plurality of requesting devices, a first predetermined number of tokens, responsive to the requesting device accessing the transaction at the attestation address; subsequently receive, from a first requesting device of the plurality of requesting devices, a request indicating that the attestation may be invalid, responsive to the first requesting device accessing the transaction at the attestation address; provide, to the first requesting device responsive to the request, a second predetermined number of tokens, the second predetermined number of tokens less than the first predetermined number of tokens; and provide, to each requesting device other than the first requesting device of the plurality of requesting devices, a portion of a third predetermined number of tokens, the third predetermined number of tokens selected proportional to the trust level assigned to the validating device.

In some implementations, the portion of the third predetermined number of tokens comprises a predetermined penalty number of tokens, minus the second predetermined number of tokens, divided by a number of requesting devices of the plurality of requesting devices other than the first requesting device. In some implementations, the third predetermined number of tokens is equal to the first predetermined number of tokens divided by a value inversely proportional to the probability that the attestation is correct. In a further implementation, the value inversely proportional to the probability that the attestation is correct comprises a difference between one and the probability that the attestation is correct multiplied by a weighting coefficient.

In some implementations, the second predetermined number of tokens is proportional to the probability that the attestation is correct multiplied by the first predetermined number of tokens. In some implementations, the portions of the third predetermined number of tokens are equal. In some implementations, the processor is further configured to record invalidity of the attestation represented by the transaction at the attestation address within the distributed or centralized ledger, by the validating device, responsive to the request. In some implementations, the third predetermined number of tokens is at least ten times the first predetermined number of tokens.

In another aspect, the present disclosure is directed to a non-transitory computer readable medium comprising instructions that, when executed by a processor of a computing system, cause the computing system to: record, in the distributed or centralized ledger, an attestation of information of a user with a transaction at an attestation address within the distributed or centralized ledger derived based on the information of the user, the validating device assigned a trust level proportional to a probability that the attestation is correct by an operator of the validating device; receive, from each of a plurality of requesting devices, a first predetermined number of tokens, responsive to the requesting device accessing the transaction at the attestation address; subsequently receive, from a first requesting device of the plurality of requesting devices, a request indicating that the attestation may be invalid, responsive to the first requesting device accessing the transaction at the attestation address; provide, to the first requesting device responsive to the request, a second predetermined number of tokens, the second predetermined number of tokens less than the first predetermined number of tokens; and provide, to each requesting device other than the first requesting device of the plurality of requesting devices, a portion of a third predetermined number of tokens, the third predetermined number of tokens selected proportional to the trust level assigned to the validating device.

In some implementations, the portion of the third predetermined number of tokens comprises a predetermined penalty number of tokens, minus the second predetermined number of tokens, divided by a number of requesting devices of the plurality of requesting devices other than the first requesting device. In some implementations, the third predetermined number of tokens is equal to the first predetermined number of tokens divided by a value inversely proportional to the probability that the attestation is correct. In some implementations, the second predetermined number of tokens is proportional to the probability that the attestation is correct multiplied by the first predetermined number of tokens.

In another aspect, the present disclosure is directed to a method for providing security of attestation of information. The method includes recording, by a validating device in a distributed or centralized ledger, one or more attestations of information of users with transactions at a corresponding one or more attestation addresses within a distributed or centralized ledger, each attestation address derived based on the corresponding information of the user, each of the one or more attestations assigned a trust level proportional to a probability that the attestation is correct by an operator of the validating device. The method also includes determining, by the validating device, a stake value based on a number of recorded attestations and an average trust level of the recorded attestations. The method also includes providing, by the validating device to a second device, a number of tokens equal to at least the determined stake value.

In some implementations, the method includes determining the stake value as a predetermined number of tokens multiplied by a function of a base coefficient, the number of recorded attestations, a growth coefficient, and the average trust level of the recorded attestations. In some implementations, the growth coefficient is a denominator of the function and limits the stake value as the number of recorded attestations increases. In some implementations, the method includes receiving, by the validating device from each of a plurality of requesting devices, a predetermined number of tokens, responsive to the requesting device accessing an attestation represented by the transaction recorded by the validating device in the distributed ledger; and the stake value is proportional to the predetermined number of tokens.

In some implementations, the method includes receiving, by the validating device from a first requesting device, a request indicating that a first attestation of information of a first user may be invalid, responsive to the first requesting device accessing the first transaction at a first attestation address derived based on the information of the first user; and providing, by the validating device to the first requesting device via the second device, a predetermined number of tokens from the number of tokens equal to at least the determined stake value, responsive to the request. In a further implementation, the method includes providing, by the validating device to each of at least one additional requesting device, the predetermined number of tokens from the number of tokens equal to at least the determined stake value, responsive to the at least one additional requesting device having previously accessed the first transaction at the first attestation address. In another further implementation, the predetermined number of tokens is proportional to a trust level assigned to the first attestation. In another further implementation, the method includes recording invalidity of the attestation represented by the transaction at the attestation address within the distributed or centralized ledger, by the validating device, responsive to the request.

In some implementations, the method includes requesting, by the validating device from the second device, withdrawal of the number of tokens; and periodically receiving, by the validating device from the second device, a percentage of the number of tokens, the percentage determined as an exponential function from an elapsed time from the withdrawal request. In some implementations, the method includes recording, in the distributed or centralized ledger, by the validating device via the second device, a transaction comprising the number of tokens.

In another aspect, the present disclosure is directed to a system for providing security of attestation of information. The system includes a validating device in communication with a system maintaining a distributed or centralized ledger. The validating device includes a processor configured to: record, in a distributed or centralized ledger, one or more attestations of information of users with one or more transactions at a corresponding one or more attestation addresses within a distributed or centralized ledger, each attestation address derived based on the corresponding information of the user, each of the one or more attestations assigned a trust level proportional to a probability that the attestation is correct by an operator of the validating device; determine a stake value based on a number of recorded attestations and an average trust level of the recorded attestations; and provide, to a second device, a number of tokens equal to at least the determined stake value.

In some implementations, the processor is further configured to determine the stake value as a predetermined number of tokens multiplied by a function of a base coefficient, the number of recorded attestations, a growth coefficient, and the average trust level of the recorded attestations. In some implementations, the growth coefficient is a denominator of the function and limits the stake value as the number of recorded attestations increases. In some implementations, the processor is further configured to: receive, from each of a plurality of requesting devices, a predetermined number of tokens, responsive to the requesting device accessing an attestation represented by the transaction recorded by the validating device in the distributed ledger; and the stake value is proportional to the predetermined number of tokens.

In some implementations, the processor is further configured to: receive, from a first requesting device, a request indicating that a first attestation of information of a first user may be invalid, responsive to the first requesting device accessing the first transaction at a first attestation address derived based on the information of the first user; and provide, to the first requesting device via the second device, a predetermined number of tokens from the number of tokens equal to at least the determined stake value, responsive to the request. In a further implementation, the processor is further configured to: provide, to each of at least one additional requesting device, the predetermined number of tokens from the number of tokens equal to at least the determined stake value, responsive to the at least one additional requesting device having previously accessed the first transaction at the first attestation address.

In some implementations, the predetermined number of tokens is proportional to a trust level assigned to the first attestation. In some implementations, the processor is further configured to record invalidity of the attestation represented by the transaction at the attestation address within the distributed or centralized ledger, by the validating device, responsive to the request. In some implementations, wherein the processor is further configured to: request, from the second device, withdrawal of the number of tokens; and periodically receive, from the second device, a percentage of the number of tokens, the percentage determined as an exponential function from an elapsed time from the withdrawal request. In some implementations, the processor is further configured to record, in the distributed or centralized ledger via the second device, a transaction comprising the number of tokens Other aspects and advantages of the invention will become apparent from the following detailed description, taken in conjunction with the accompanying drawings, which illustrate by way of example the principles of the invention.

BRIEF DESCRIPTION OF THE DRAWINGS

FIG. 7 illustrates sample levels of different validators, according to some embodiments.

FIG. 13 illustrates one embodiment of a method for invalidating attestation of information.

FIG. 14 illustrates one embodiment of a method for providing security of attestation of information.

DETAILED DESCRIPTION

Figure 1:
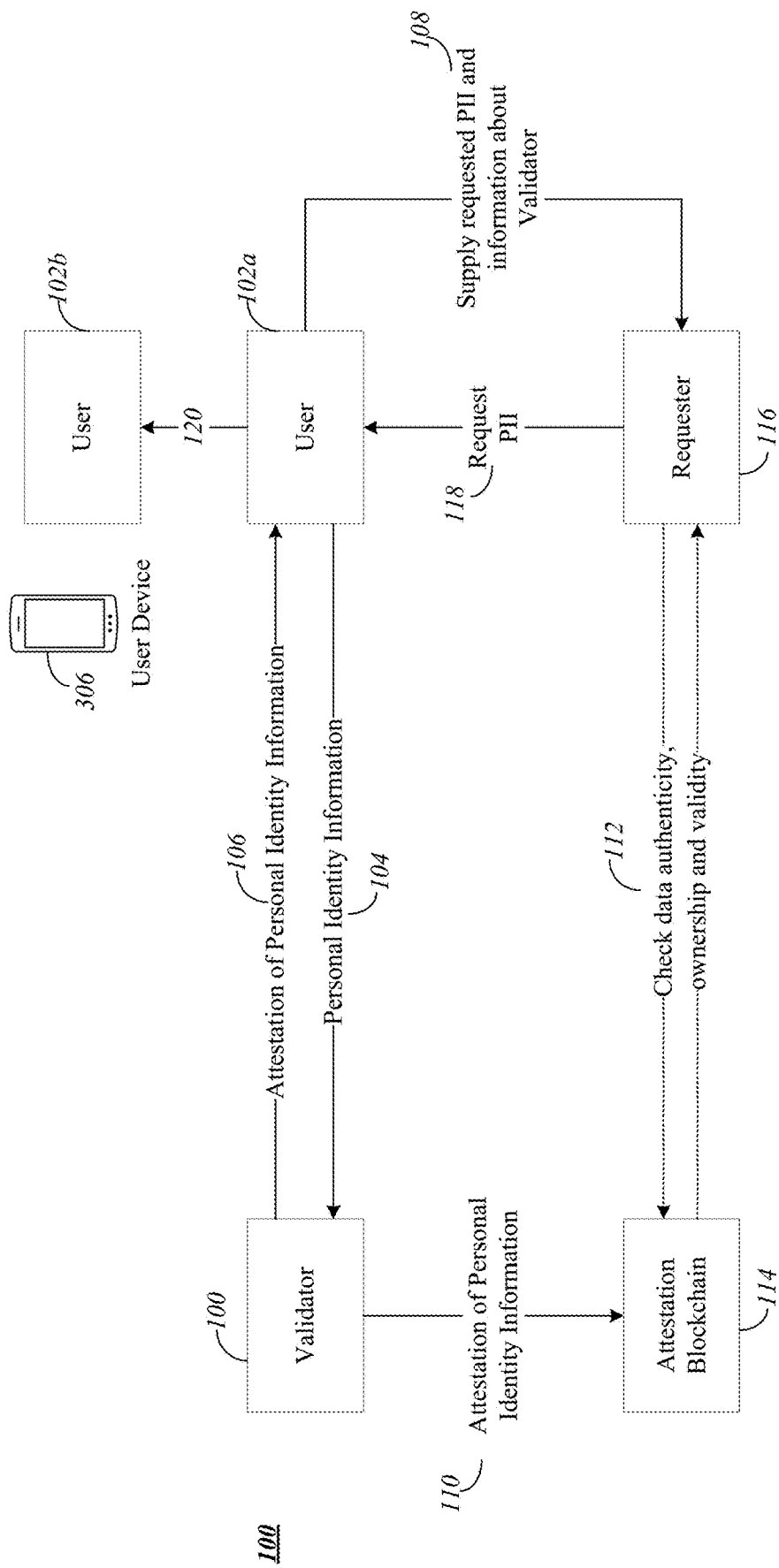
FIG. 1 shows one embodiment of a digital identity verification system from the viewpoints of a validator and requester that individuals can use to have their digital identity authenticated and an attestation recorded on a blockchain and on their device.

Before discussing specific details of implementations of the systems and methods, it may be helpful to briefly review some terminology that may be used in explaining related concepts and technologies.

The term "user" can be generically applied to an individual, a group of individuals, an organization, or any other entity that has information associated with it. The term "requester" can be generically applied to any individual, organization, or other entity that interacts with a user and as part of an interaction with the user needs to know information related to the user with a high confidence that the information is accurate and is associated with the user. For example, a "requester" may be a merchant, service provider, or any other entity that controls access to goods, services, locations (including virtual locations such as websites or web applications); may be an employer or potential employer seeking to verify employee information; may be a governmental entity seeking to verify information of a user; or any other such entity. The term "validator" can be generically applied to any individual, organization, or other entity that interacts with a user and with one or more sources of known accurate information for the purpose of validating that information provided to the validator is factually accurate, currently relevant, and associated with the user. A validator may perform several steps in this validation process. If the validator has determined with a given confidence level that the information associated with a user is factually accurate, currently relevant, and associated with the user, then the validator may create an attestation and may record this attestation on a centralized or distributed ledger. In general, a validator is said to "attest" to information associated with a user when the user's information is validated and an attestation is created. For example, a validator may be a bank or credit bureau or agency, a governmental agency, a third-party entity responsible for verifying and attesting to user information, or any other such entity. In general, the term "attestation" may be used to refer to any form of authenticated information associated with a user, i.e. information that has been attested to. An attestation may be recorded on, or can be referenced in, a centralized or distributed ledger, such as a blockchain based ledger. As discussed below, the attestation may be correct or incorrect; in other words, in many implementations, the attestation may reflect the validator's belief that the user information is authentic, but this belief may be incorrect and may, in some implementations, be associated with a confidence level as to its correctness. In some embodiments, an "attestation address" may refer to an address in a centralized or distributed ledger at which an attestation transaction is recorded. The attestation address may be created from the user information being attested to and may be signed by one or more public keys. For example, in some implementations, an attestation address may be created by signing a hash of a user's information with a public key of the user, a public key of a validator that created the attestation, and the public key of a digital wallet associated with the user, using an M of N multisig protocol. The resulting string may be used as an index within a distributed or centralized ledger, sometimes referred to as a "wallet" address or by similar terms. An attestation transaction may be recorded in association with the attestation address, thus allowing others (e.g. requesters or other entities) to look up the attestation transaction in the ledger by re-calculating the attestation address from the user information and any public keys utilized. Accordingly, the requester may not be given the address directly, nor does the user even need to remember the address in many implementations; instead, simply providing the information to be verified and the public keys enables the requester to determine the attestation address and whether the attestation transaction has been recorded. In general, an "attestation transaction" may refer to the process of recording an attestation of a user's information on a centralized or distributed ledger. In some examples some implementations, an attestation of a user's information may be recorded on a centralized or distributed ledger by associating some value with an attestation address that was derived from the attestation of the user's information. In some embodiments, an attestation transaction refers to the process of spending cryptocurrency to an attestation address on a blockchain. For example, in some implementations, a value or token or currency amount may be added to a "wallet" at the attestation address within the ledger. A requester may subsequently receive the user information, recalculate the attestation address, and determine whether the wallet contains or is associated with the value or token or currency amount. If so, the attestation transaction has been recorded, and the requester may be confident that the validator has validated the user information and not revoked the validation (e.g. by subsequently subtracting the value or token or currency amount, such that the wallet is empty or the attestation address is associated with a zero value).

In a general overview, FIG. 1 shows one embodiment of a digital identity system that individuals or entities can use to have their digital identity or other personal information authenticated and verified. The system comprises one or more users, such as users 102a and 102b, one or more requesters 116, one or more validators 100, and attestation blockchain 114.

Referring to FIG. 1 in more detail, in some examples, a user 102a's identity or other information related to user 102a, once authenticated or "attested to", may be stored on a centralized or distributed ledger, for example on attestation blockchain 114. In some embodiments, an attestation of information associated with user 102a may be stored on attestation blockchain 114 and on device 306 of user 102a. In some embodiments, this may be referred to as user 102a having a digital "fingerprint" of their digital identity authenticated and stored on attestation blockchain 114 and, in some embodiments, on user device 306.

Most identity management systems are in large, centralized databases or server repositories that are centrally managed. Such a centralized database or server represents a single point of trust, and a single point of failure. Participants in a system that rely on such a centralized database must place a high level of trust in the correct operation and accuracy of the data stored in the centralized database. Additionally, malicious actors have a centralized point to focus an attack on, and a security breach or leak would have significant scale and impact. Centralized security services typically require users' sensitive and secret data, including secret keys and passwords, to be stored in repositories. Even when hashed or encrypted for security, most people do not have strong passwords, and existing breaches can be used to discover hashed passwords and keys.

Implementations of identity management systems lacking the features of systems and methods discussed herein that centrally store user 102a's explicit identifying attributes and their sensitive security credentials cannot provide privacy and anonymity of users 102a's data or of user 102a's transactions. There is nothing to stop such implementations of an identity management system from collecting personal and transaction data and sharing this data in unauthorized ways and without user consent, for example to consumer intelligence and consumer behavior analytics companies.

A blockchain, which is a peer-to-peer network also known as a distributed ledger, allows records within the ledger to be held securely and yet be openly authenticated, referenced and documented so that data can be trusted as reliable. A blockchain represents an archive of data and transactions that are performed in a data processing system.

A blockchain enables peer-to-peer online transactions of information with overall consensus without the need for a trusted intermediary. This was achieved by contriving a system in which it is difficult (from the standpoint of computational resources) to add transactions to the blockchain, but easy for anyone to check whether transactions are valid. The difficulty means that there is a cost involved in attempting to process transactions, and rewards for doing so legitimately in the form of new currency or transaction fees. Fraudulent transactions are quickly identified and discarded from the blockchain. Attempting to add a fraudulent transaction is costly, entails foregoing the financial incentives for acting honestly, and is highly unlikely to succeed because no single party in the overall network has more than a small proportion of the overall 'authority' to validate transactions. In practice, it is simpler and more profitable to act honestly. Because blockchains are typically maintained by a large network of participants, no one actor can easily gain enough influence to submit a fraudulent transaction or successfully alter recorded data (although possible in theory with enough resources, it would be prohibitively expensive in practice for large blockchain systems). Any change that a party attempts to make to the blockchain is recognized and rejected by the majority. Everything that takes place on the blockchain is visible to anyone. It is possible to see everything that has ever been recorded on the blockchain.

Blockchain addresses are strings of alphanumeric characters that cannot intrinsically be associated with a specific individual and may be randomly selected or generated in many implementations. In these legacy systems, while it is easy for the owner to prove they control an address if they wish, and it is often possible to build up a picture of transaction relationships due to the transparent nature of the blockchain, the address itself does not contain the owner's PII.

In many implementations of blockchain systems, the data stored in a distributed ledger are all public and therefore not vulnerable to theft. Data integrity is protected and therefore not vulnerable to illegal or accidental modifications, and the data is time-stamped so that its provenance can be validated. Data is sequenced in a cryptographic time chain so illegal insertions of false data is may be readily detected due to signature or hash mismatches. These ledgers operate without the need for a trusted third-party and without the need to trust any component of the system overall. The blockchain is policed by every member of the network and its integrity checked and agreed by the network on an ongoing basis. Because of this immutability, a transaction that has been accepted into the network cannot be reversed. With no trusted intermediary to act on behalf of the user or control the movement of their funds, blockchain transactions are immune to chargebacks and are like paying in physical cash, but online.

User 102a may be any entity that has information attached to it, e.g. a human, a robot, a business, a computing system or server, a device associated with a user, a smart car, etc. In some embodiments, requester 116 is an individual or a business or a service provider that user 102a wants to have an interaction with. In some embodiments, validator 100 is an identity verification provider. In some examples, requester 116 may also be a validator 100, and validator 100 may also be a requester 116. In some embodiments, a service provider may be a validator 100 of user PII in one interaction, and a requester 116 of validated user PII in another interaction. Attestation blockchain 114 stores attestations and can be any distributed ledger platform. In some embodiments, attestation blockchain 114 can be the ETHEREUM blockchain (Ethereum Foundation, Zug, Switzerland), HYPERLEDGER (Linux Foundation, San Francisco, California), R3CORDA (R3, New York City, New York), HASHGRAPH (Hedera Hashgraph, Richardson, Texas) and the BITCOIN blockchain. It is understood that any centralized or distributed ledger that is presently in use or is developed in the future may be used as a platform for the current invention.

Bitcoin is a peer-to-peer currency that was launched in January of 2009 as blockchain's first application. Bitcoin's innovation was solving the so-called 'double-spend' problem in online financial transfers: the issue that data is readily copied, and that it is therefore impossible to prevent the same funds from being sent to more than one recipient unless there is a trusted intermediary to keep accounts. This centralized model was used by all banks and payment processor who dealt with electronic funds transfers. Such a centralized approach always involves trust, because there must be an authority whose job it is to organize the transfer of money from one account to another. In the physical world, money is handed over directly from one person to another person. Online, however, there must be intermediaries. Rather than transferring funds from their account directly to the recipient, the user instructs the intermediary to move funds on the user's behalf.

This centralized system has a number of potential drawbacks. The trusted intermediary may prove untrustworthy, they have control over the user's funds, and they can ultimately block or reverse transactions. The centralized nature of online banking and other online money transfer protocols leaves users vulnerable to intervention by these trusted intermediaries and comes with security risks, because there is always a single point of failure. Centralized databases can be hacked, and their administrators compromised or coerced by a range of actors.

The Bitcoin blockchain was designed for peer-to-peer online transfers of value, effectively acting as digital cash. It achieves this not by moving money from one address to another, but by maintaining and updating the ledger to reflect how much money is registered to each address. The same approach to recording data transparently, securely and immutably by consensus of the entire network can be extended to many other applications (since the financial value in the Bitcoin network is simply information about who owns what). For example, messages can be stored on the blockchain, either encrypted or in plain text. Additionally, secondary tokens representing assets, such as shares in a business, securities, commodities, and other currencies, can be secured on the blockchain.

In step 104, user 102a provides personal identifiable information (PII) to validator 100. Validator 100 authenticates the PII and attests to the validity and the user's ownership (or control) of the PII. In some examples, validator 100 creates an attestation of the PII by creating a hash the PII and then creating an "attest key" by combining the hashed PII and the public key that is associated with, or created for, that PII. In some embodiments, this may be the user's public key. In some embodiments, the hashed PII and the public key are combined using elliptic curve addition. Validator 100 may create an attestation address by signing the attest key with at least the validator's public key. For a single signature transaction, a hash function can be applied to the attest key to create the attestation address. In some embodiments, the hash function is the P2PKH algorithm. An attestation address may be a multisig attestation address, which in one implementation is a result of the attest key being signed with validator 100's public key and the public keys of all cosigners according to an M of N multisig redeem script cryptographic signing protocol.

It is also possible to create a blockchain based system that takes a similar approach to a currency blockchain, applied to the execution of computer code. Software has historically been run on a single computer or centralized server; just as online money transfers have historically been centralized. Smart contracts are code that is executed on a blockchain, called decentralized applications, or 'dApps'. Once uploaded to a blockchain, these are stored immutably and run when required conditions are met.

Smart contracts—which are also known as self-executing contracts, blockchain contracts, or digital contracts—are stored and replicated on a centralized or distributed ledger and supervised by the network of computers that run the centralized or distributed ledger. In this format, contracts are converted to computer code that can execute a function when invoked. A smart contract between parties is written as code into the blockchain. The parties involved are anonymous, but the contract is in the public ledger. A triggering event takes place and the contract executes itself according to the coded terms. In contrast to the Bitcoin blockchain, which is designed to execute the specific function of transferring value in BTC, a smart contract platform is a general purpose blockchain. Examples of smart contract platforms include ETHEREUM (Ethereum Foundation, Zug, Switzerland), ROOTSTOCK (RSK) (IOV Labs, Buenos Aires, Argentina), EOS (Block.one, Hong Kong, China), NEO (NEO Team, Shanghai, China), and DFINITY (DFINITY, Palo Alto, United States). Blockchains require that transaction fees are paid in the native currency of the blockchain, for example Bitcoin ('BTC') for the Bitcoin blockchain, and ether ('ETH') for the Ethereum blockchain. Fees for executing transactions on the Ethereum blockchain are related to computational complexity, bandwidth, and storage needs (in a system known as "gas"). Gas units each have a price that can be specified in a transaction. Smart contract platforms allow for the creation of separate tokens that are distinct from the native currency. As noted previously, these tokens are digital assets, cryptographically secured upon the blockchain, which can represent whatever the issuer wants and is prepared to back (if necessary), and which can play whatever role in the system that its rule-set determines. These tokens can be transferred on a peer-to-peer basis for a transaction fee, just like native currency (e.g. ETH). They can be incorporated into smart contracts as an integral part of the system.

In some embodiments, a multi signature process is achieved by creating a smart contract stating the number of, and the public keys required for the signature. In some examples, a multisig attestation address comprises two or more public keys and is created using the Pay to Script Hash (P2SH) protocol.

In step 110, validator 100 writes an attestation of user 102a's PII on attestation blockchain 114. In step 106, validator 100 sends the attestation of user 102a's PII to user 102a to store on user 102a's device 306. In some embodiments, the attestation of the user 102a's PII and the user 102a's encrypted PII itself, may be stored on user 102a's device 306, in some examples using high-level encryption and/or biometric locks, such as fingerprint identification.

User 102a may try to initiate an interaction with requester 116. To proceed with the interaction, in step 118, requester 116 may request PII from user 102a. In some examples, user 102a and requester 116 may have to agree on a mutually acceptable validator e.g. validator 100. In step 108, user 102a may supply the requested PII to requester 116 along with information to enable requester 116 to view attestation transaction details on the distributed ledger. In some examples, in step 108, user 102a may supply the requested PII associated with more or more attestations issued by one or more validators 100. In step 112, requester 116 may use the PII from user 102a and information about the one or more validators 100 that attested to the requested PII to check the PII authenticity, ownership, and validity on attestation blockchain 114. In some embodiments, requester 116 may check the PII authenticity, ownership, and validity by calculating the one or more associated hashes and creating the one or more attestation addresses using at least information about the one or more validators 100 that attested to the PII embodied in the one or more hashes, and checking that there is a non-zero value at these one or more attestation addresses. In some examples, if requestor 116 is satisfied with the PII authenticity, ownership, and validity based on the one or more hashes, requestor 116 may purchase the one or more attestations from the one or more validators 100. Smart contracts may be used to put payment for attestations into escrow. User 102a may supply their PII, for example in plain text form, to requester 116. In some examples, user 102a may then initiate the release the payment from escrow. If, for example as a result of the above method, requester 116 is able to successfully verify user 102a's PII, then requester 116 may proceed with the original interaction that user 102a initiated.

Any member of the system in FIG. 1 can be an incentivizing party to introduce new users to the system. For example, in step 120, user 102a may introduce new user 102b to the system. In some examples, introductions to new users may be enabled by an incentivization mechanism with tokens that other participants collectively provide to accelerate the overall adoption of the system. Validator 100 may be an individual, a group of individuals, an entity or service provider that is trusted to validate a user's PII. Examples of validators 100 include but are not limited to financial institutions such as banks, government entities, other companies such as utility providers, and verification providers, such as biometrics, network solutions, and device identification providers. User 102a's PII may include elements such as name, phone number, e-mail address, address (street, city, country, post or zip code), number of children, SSN, FEIN or other government identification number, date of birth, employer or advisory board participation, number of reporting employees or coworkers, and any other information that is personal or tied to a specific user.

In some embodiments, user's PII may be structured in a hierarchy. In some embodiments, the structure of user 102a's PII may follow a defined model. In some embodiments, the structure of user 102a's PII may follow an industry standard for a container or framework for personal data. In some embodiments, the negotiation of the interchangeable structure of user 102a PII and the attestation may be dynamic between participants in the system.

In an embodiment, the provability of a portion of the PII in an attestation is achieved by organizing the PII into a Merkle tree, also known as a hash tree. Hash trees allow efficient and secure verification of the contents of large data structures. In some embodiments, a cryptographic hash function such as SHA-2 (National Security Agency, United States) is used for the hashing. The main difference between a hash tree and a hash list is that one leaf of the hash tree can be verified independent of the rest of the tree. This is advantageous in an identity verification application since the data structure containing the PII can be split up into smaller data blocks containing a subset of the PII, so that a user 102a may share only the PII that the requester 116 has asked for without sharing PII that is not needed or was not requested. In some embodiments, the root hash is converted to an "attest key" using the additive property of elliptic curve cryptography ('ECC'):

$$k_{pub} + h = k_{attest}$$

where $k_{pub}$ is the public key of the user, h is the root hash, $k_{attest}$ is the attest key, and '+' represents addition in the ECC sense. The attest key is combined with the public key of validator 100 and one or more cosigner's public keys, for example the public key for a digital wallet provider, to create an attestation address which is a blockchain address.

In step 110, validator 100 records the attestation on attestation blockchain 114 at an attestation address created from the root hash which is signed by validator 100 using the validator's key. In some examples, validator 100 records the attestation on attestation blockchain 114 at an attestation address created from the root hash which is signed by using the keys of multiple cosigners, including using validator 100's key, user 102a's key, and the keys of one or more third parties, such as a digital wallet provider, using a multisig protocol. In some embodiments, validator 100 records an attestation of user 102a's PII by sending an amount of cryptocurrency to an attestation address. This blockchain address comprising the attestation address makes it infeasible to determine the user 102a and validator 100 associated with the blockchain address, which is essential to protecting the privacy of the participants. If user 102a does not wish to reveal all of the underlying PII that was attested to, portions of the hash tree can selectively be revealed, with only hashes provided for any elements user 102a prefers not to reveal.

Using a smart contract platform, the system would store the signed root hash at a discoverable location. In this embodiment, revocation status may not be represented by unspent currency, but rather modeled as a parameter of the attestation. A participant in the system may reproduce the hash by creating it from the original PII or from partial information of the original PII if user 102a provides intermediate hashes of the Merkle tree. This allows user 102a to share PII with another participant in the system and prove that it is the same PII that was previously attested to by validator 100. Should validator 100 or user 102a wish to revoke an attestation for any reason, this revocation is reflected in an associated blockchain transaction. The original attestation remains in the immutable ledger, but may have no tokens or currency associated with the attestation address, indicating that the attestation is no longer valid.

In step 106, validator 100 sends the attestation of user 102a's PII to user 102a to store on the user's device 306. The transmission of the PII from user 102a to validator 104, and the transmission of the attestation of the PII from validator 100 to user 102a in step 106 may be secured using end to end encryption or transport encryption as is known in the art. In some embodiments, user 102a stores plain text PII on their device. The PII may be encrypted locally on the device before it is stored, for example using biometric data or locks such that only the user may be able to access the plain text PII. Metadata or other information about validator 100 may additionally be stored on user 102a's device. In some embodiments, information such as name, address, identification number (SSN or FEIN for example) and contact details of validator 100 are stored on user 102a's device 306. In some embodiments, a trust level or reputation of validator 100 is stored on user 102a's device 306. The specific attestation that validator 100 issued and associated metadata may also be stored on user 102a's device 306, and user 102a sends this information to requester 116 when requester 116 requests user 102a's PII.

Properties of validator 100 may be validated against the attestation blockchain 114 in order for a third party to determine its authenticity. In some embodiments, an identity verification system operator or government entity may attest to properties of validator 100. The attestation of properties of validator 100, for example metadata associated with the validator and the public key of validator 100, may be stored on attestation blockchain 114. In some examples, the attestation of properties of validator 100 may be stored on user 102a's device. In some examples, the blockchain attestation address of properties of validator 100 may be stored on user 102a's device 306. In some examples, user 102a provides this information to requester 116, and requester 116 may use this information to validate user 102a's PII against attestation blockchain 114.

User 102a may try to initiate an interaction with requester 116. For example, requester 116 may be a car rental agency and user 102a may request to rent a car. To proceed with the interaction, in step 118, requester 116 may request PII from user 102a. Requester 116 may request user 102a's first and last name, date of birth, credit card number, credit card expiration date, credit card security number, billing address of user 102a's credit card, or any other pertinent information. In some examples, requester 116 may request additional information, such as an accident history of user 102a, or insurance claim information for user 102a. In some embodiments, requester 116 may provide to user 102a a list of validators that requester 116 trusts.

In some examples, user 102a has the data that requester 116 requires in attested form, attested by a validator 100 that requester 116 trusts. In step 108, user 102a may supply information to enable viewing of transaction details such as a timestamp, the root hash of its hash tree or the hash of a block before the block containing the desired PII on the attestation blockchain 114. In step 108, user 102a may supply the requested PII in readable form to requester 116, along with information about validator 100 that authenticated the data. In some examples, the information about validator 100 includes validator 100's public key. In some examples, information about validator 100 includes information about the hashing algorithm used by validator 100. In some examples, user 102a uses end-to-end encryption when sending PII to requester 116 to make sure that the PII is not visible to other parties if it were to be intercepted. In some examples, user 102a sends the PII in the form of an attest key created by validator 100 to requester 116.

In some embodiments, in step 112 requester 116, uses information received from user 102a, in some examples including information about validator 100, to create or recalculate an attestation address such that requester 116 may view transaction details for the attestation associated with the attestation address and previously recorded by a validator or other entity on attestation blockchain 114, for example to check the authenticity, ownership, availability, or validity of user 102a's PII on attestation blockchain 114. In some examples, requester 116 uses information about validator 100 to create a hash of plain text user 102a PII received from user 102a using the same technique, hashing algorithm, and one or more public key(s) that validator 100 used to create the attestation record on attestation blockchain 114. In some examples, requester 116 creates the attest key using the hashed user PII and the user's public key, and an address on attestation blockchain 114 comprises this attest key. If requester 116 is able to find transaction for user 102a at this address on attestation blockchain 114, for example a transaction with a non-zero currency value or with a smart contract that is valid, then requester 116 can be certain that the plain text PII received from user 102a has been attested to and can be trusted and has not been revoked, and requester 116 may proceed with the transaction that user 102a initiated.

Figure 2:
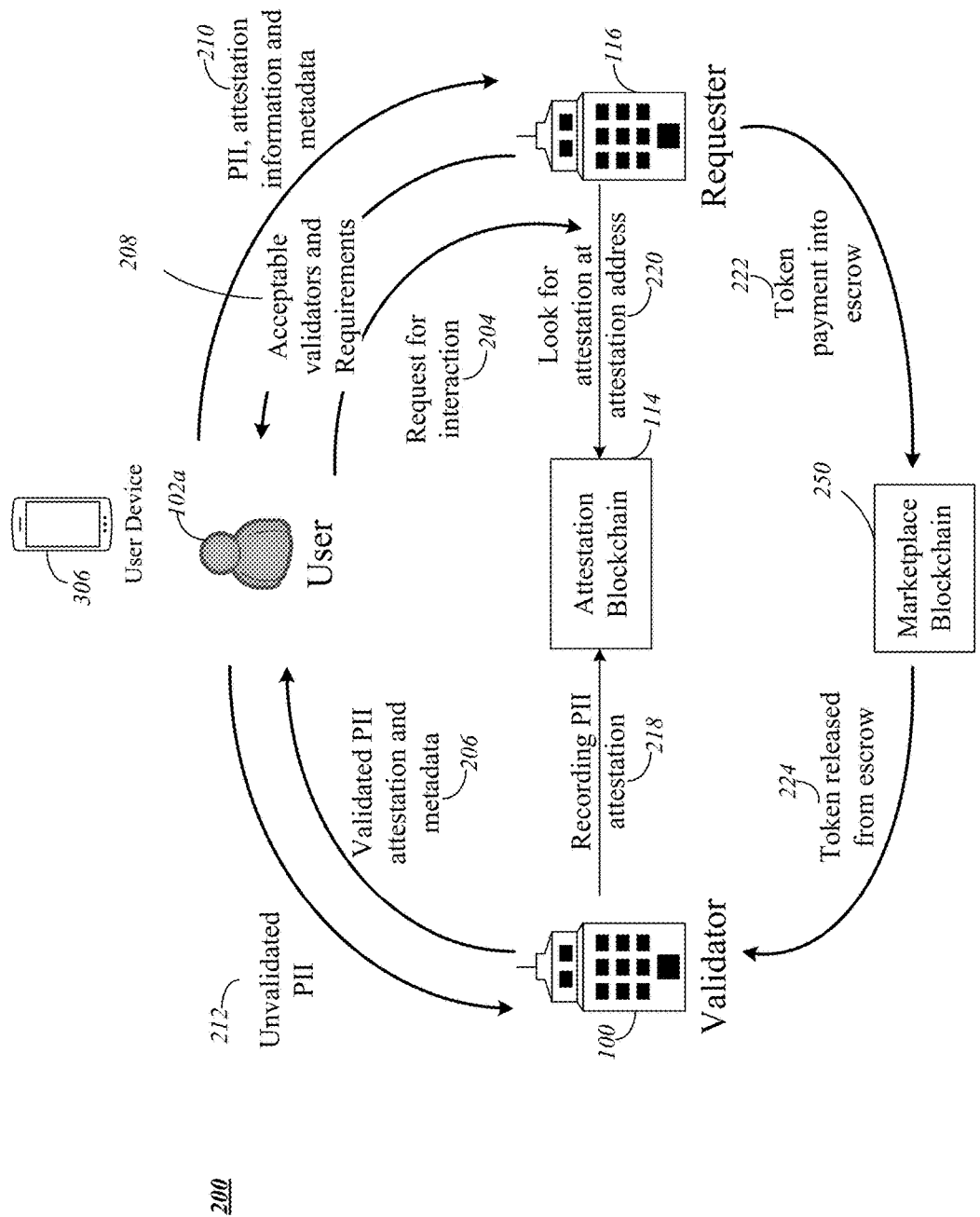
FIG. 2 shows a simplified diagram illustrating one embodiment of how a user, validator, requester, attestation blockchain, and marketplace blockchain interact in the token economy system for identity verification services.

In brief description, FIG. 2 is an illustration of one embodiment of a token economy system including user 102a, requester 116, validator 100, attestation blockchain 114, and marketplace blockchain 250. Describing FIG. 2 in more detail, the token economy system ensures that user 102a remains in control of their PII, as user 102a must give consent before any identity verification transaction between validator 100 and requester 116 can be completed. In some embodiments, in step 204, user 102a approaches requester 116 for an interaction. In some examples, the interaction comprises requesting a service, purchasing a good, voting, trading of securities, or any other interaction. In step 208, requester 116 sends user 102a a list of requirements necessary to perform the interaction. In some embodiments, requester 116 sends user 102a a list of validators acceptable to requester 116, and the user PII that is required. In some examples, in step 218, validator 100 may have previously recorded an attestation to user 102a's PII in attestation blockchain 114. If user 102a has the PII required by requester 116 attested to by a validator 100 that requester 116 has indicated is acceptable, requester 116 and validator 100 may mutually agree on a price for the attested PII. Once the price has been agreed, in step 222 requester 116 may place tokens into an escrow smart contract within marketplace blockchain 250. In step 210, user 102a sends the PII to requester 116 in readable form, for example in plain text form, and sends attestation information for example information associated with the validator that made the attestation such as an identification or name of the validator or other such information, and/or associated metadata (e.g. the validator's public key and other metadata about validator 100) that is required for requester 116 to be able to verify the attestation on attestation blockchain 114.

In some embodiments, user 102a does not have a suitable attestation. In one example, some of user 102a's PII that requester 116 has indicated is required has been attested to by a validator that requester 116 accepts, but some of user 102a's PII that requester 116 has indicated is required has not been attested to by a validator that requester 116 accepts. In some examples, all of user 102a's PII that requester 116 has indicated is required has been previously attested to, but none of user 102a's PII has been attested to by a validator that requester 116 accepts. In some examples, none of user 102a's PII that requester 116 has indicated is required has been attested to by any validator. In these and other cases where user 102a does not have a suitable attestation of the PII that requester 116 has indicated is required, user 102a may approach a validator that is accepted by requester 116 with the PII that requester 116 has indicated is required that has not been validated by a validator 100 acceptable to requester 116. In step 212, user 102a sends unvalidated PII to validator 100, wherein validator 100 is an accepted validator for requester 116. Once validator 100 is satisfied with the authenticity of user 102a's PII, it will attest to the accuracy and provenance of user 102a's PII by creating an attestation of user 102a's PII. This attestation, which in some embodiments may be referred to as a digital "fingerprint" of the PII, is recorded onto attestation blockchain 114 in step 218. In step 206, validator 100 sends the validated PII attestation and associated metadata to user 102a. In some embodiments, the original PII, the attestation, and the associated metadata is stored on the user's device 306 in an encrypted form. Encryption on device 306 is an independent layer of security that protects against information being compromised if user 102a's device 306 is lost or stolen. In some embodiments, stored on user 102a's device 306 are the encrypted raw PII, the attestation of the PII, and the associated metadata of the attestation of the PII, such that user 102a is able to send this information to requester 116 if required.

In some embodiments, requester 116 takes user 102a's PII, and metadata and information about validator 100 and recreates the hash of the user 102a's PII. Requester 116 may produce the hash of user 102a's PII, and create an attest key and an attestation address. In step 220, requester 116 inspects attestation blockchain 114 to see if a valid transaction is found on the attestation blockchain 114 at the attestation address that requester 116 created from the user 102*a*'s PII, and requester 116 verifies that it has not been revoked. In some examples, the attestation is considered to be revoked if there is a zero currency value or zero tokens or other values stored at or in association with the attestation address. In some examples, a smart contract may be used to determine if the attestation at the attestation address has been revoked. If the attestation has not been revoked, then the PII from user 102*a* is verified, and the requester proceeds with the interaction. In step 224, a smart contract running on marketplace blockchain 250 causes tokens from requester 116 that are held in escrow to be released. In some examples the smart contract running on marketplace blockchain 250 causes the tokens from requester 116 that are held in escrow to be released responsive to requester 116 verifying the PII of user 102*a*. In some embodiments the smart contract running on marketplace blockchain 250 causes the tokens from requester 116 that are held in escrow to be released irrespective of whether requester 116 proceeds with the interaction with user 102*a*. In some embodiments, the smart contract running on marketplace blockchain 250 causes the tokens from requester 116 that are held in escrow to be released as soon as user 102*a* has transmitted the PII, the attestation, and the metadata to requester 116. In some embodiments, some tokens from requester 116 that are held in escrow are released to validator 100, user 102*a*, or the system operator. In some embodiments, user 102*a* receives a predetermined proportion of the tokens from requester 116 that are released from escrow, and validator 100 receives all or some of the remainder. In some embodiments, all of the tokens in escrow may be released to either validator 100 or user 102*a*. In some embodiments, tokens are transferred directly from requester 116 to the identity validation system, user 102*a*, validator 100, or any other system participant upon satisfaction of any of the aforementioned conditions or any other agreed condition, rather than being held in escrow.

Figure 3:
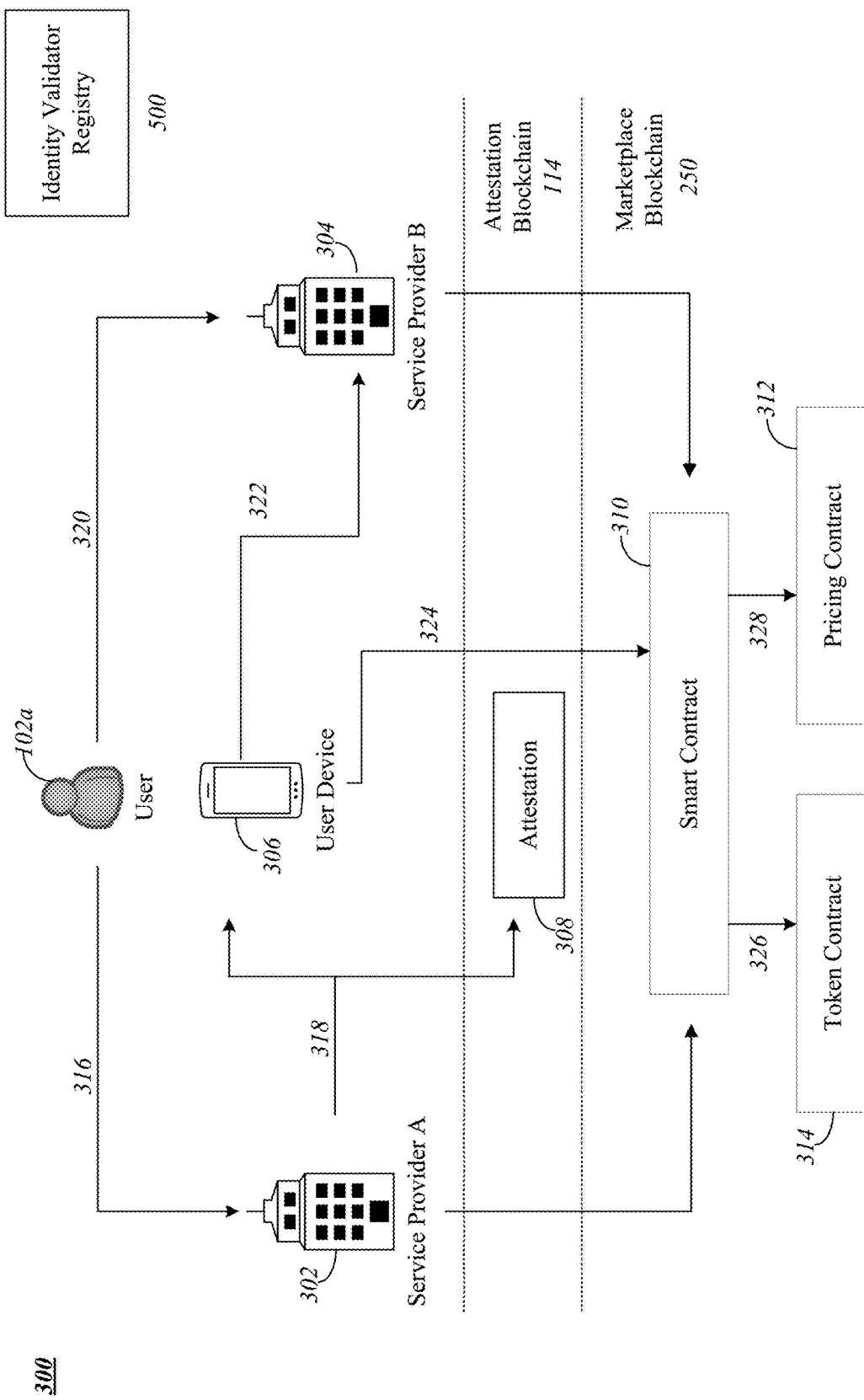
FIG. 3 shows a simplified block diagram of one embodiment of a system for attestations to be shared between service providers.

FIG. 3 shows a simplified block diagram of a system 300 for attestations to be shared between identity verification service providers. In a general overview, in some examples, system 300 includes one or more users 102*a*. User 102*a* may possess or be in control of device 306. In some examples, system 300 includes one or more service providers 302 and 304. In some examples, system 300 includes an attestation 308 which may be recorded on attestation blockchain 114. In some embodiments, system 300 may utilize marketplace blockchain 250. One or more smart contracts 310 may be stored on marketplace blockchain 250. In some embodiments, system 300 may include token contract 314 and in some embodiments, system 300 may include pricing contract 312. Token contract 314 (which may read or write to a token leger) may indicate who owns how many tokens. An escrow smart contract may encode the transaction of tokens between system participants, for example between requester 116 and other system participants, such as user 102*a* and a validator 100. A pricing contract may contain the listing price that validator 100 asks for a one-time transmission of PII between user 102*a* and requester 116. In some embodiments, an ontology smart contract may define what kind of PII are traded in the system. In some examples, system 300 may include a registry of validators 500 that are able to validate PII and issue attestations. In some embodiments, service providers may be validators and may be included in a registry of validators. In some embodiments, a registry of validators may be referred to as an identity validator registry. In some embodiments, entries in a registry of service providers that are able to validate PII and issue attestations 500 may include the validators that are registered in the system, as well as a digital "fingerprint" of their associated metadata, public key, and other information associated with the validator.

Referring to FIG. 3 in more detail, service provider A 302 and service provider B 304 may take on different roles in system 300. The set of roles that service provider A 302 and service provider B 304 may take on are the same, and in the detailed discussion of these roles, the term service provider will be used generally to refer to any service provider in system 300, including service provider A 302 and service provider B 304. Service provider in system 300 may take on the role of a user in system 300 and requester in system 300. When acting as requester in system 300, a service provider may desire to have some information about another service provider attested to by validator 100 in system 300, for example so that a different service provider in system 300 may be able to verify aspects of the identity of a service provider. When acting as a validator in system 300, a service provider may be trusted by user 102*a* and/or requester 116 to validate the authenticity and provenance of PII. When acting as a requester 116 in system 300, a service provider may have a requirement to verify PII from a user in system 300, may make a request to the user for PII, and may make a request to a trusted validator 100 in the system to use an existing attestation of the PII to verify the user. System 300 may have any number of service providers, and any of the service providers in system 300 make take on any of the roles described. At different times, service provider A may act like a user, a validator, or a requester.

In some examples, user 102*a* in system 300 may have control over user device 306. In some embodiments, user device 306 may be a personal computer or a laptop computer. In some embodiments, user device 306 may be a portable computing device such as a tablet or a smartphone. User device 306 may be a shared device on which user 102*a* has a user profile which is accessible to user 102*a* by entering a password or pin or other code which is private and known only to user 102*a* or by using biometric information. In some examples, user device 306 may be a smart watch which may have direct connectivity to a network or may have connectivity to a network through a separate device controlled by user 102*a*, such as a smartphone. User device 306 may be a connected car. In general, user device 306 may be any connected device for which all or a partition of the device is solely under control of user 102*a*. In some embodiments, an identity verification application, or any other application, may execute on user device 306, the identity verification application configured to execute instructions that enable functionality of system 300.

Attestation 308 comprises a transaction stored at an attestation address calculated based on a hash of PII of user 102*a* that is signed by at least validator 100 and recorded on attestation blockchain 114. Attestation 308 is created by a validator 100 when the validator has checked and validated the authenticity and provenance of the PII, and is assured of its accuracy (although, as discussed below, the PII may nonetheless be inaccurate). In some examples, attestation 308 may include supporting metadata. The supporting metadata may include the verification or validation level of the validator, and details related to the validator's process of verification or validation of information, such as a confidence level for the attestation. A verification or validation level can be derived from the validator's accuracy—that is, the probability of the validator's correct attestation. A validator with a higher accuracy will have a higher verification or validation level. In some examples, the supporting metadata may reference any applicable standards that have been used to structure, organize, or encode PII in attestation 308.

In some embodiments, smart contract 310 is used to capture details of an agreement between a validator 100 and a requester 116. In some examples, service provider A 302 is acting as a validator and may have previously attested to the user 102a's PII that is required from service provider B 304 acting as a requester, and service provider B 304 accepts service provider A as a trusted validator. In some examples, service provider B 304 acting as requester offers a price to service provider A 302 acting as validator to provide an attestation of user 102a's PII. In further examples, service provider A 302 acting as validator may advertise a price (for example to service provider B 304 acting as requester) to provide an attestation of user 102a's PII. In some examples, the price offered is represented in tokens that are used in system 300. The agreement between service provider B 304 acting as requester and service provider A 302 acting as validator may be captured in smart contract 310. Service provider A 302 acting as validator may interact with smart contract 310 and service provider B 304 acting as requester interacts with smart contract 310. In some examples, smart contract 310 may include details of escrow, where the agreed price in tokens is held pending the completion of the interaction between user 102a and service provider B 304 acting as requester. In some examples, smart contract 310 is an application, module, or other software component or code that is stored on the marketplace blockchain 250 and configured to execute when one or more actions take place in system 300. In some examples, smart contract 310 may be an application, service daemon, routine, or other executable logic. Smart contract 310 may be executed on an operating system, on a virtual machine, on multiple processing nodes in a decentralized form, or may be run in any other appropriate environment. In some embodiments, smart contract 310, when executed, causes a graphical user interface to be displayed on user device 306. In other embodiments, smart contract 310 allows for input through a non-graphical user interface, such as a user interface that accepts text or vocal input without displaying an interactive image. A graphical user interface may be displayed on a screen of user device 306, or a monitor connected to a desktop or laptop computer or on any other display. User 102a may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, California), Microsoft Internet Explorer (Microsoft, Redmond, Washington), or Mozilla Firefox (Mozilla Foundation of Mountain View, California), or may be any other type of interface.

System 300 may include token contract 314 and pricing contract 312, in some embodiments as part of marketplace blockchain 250. In some embodiments, token contract 314 tracks the ownership of tokens. In some examples, pricing contract 312 contains the listing price that validator 100 requests for a one-time validation of PII transmitted between user 102a and requester 116. In some embodiments, other contracts that can be used include an escrow contract which encodes the transaction of tokens between requester 116 and validator 100 or user 102a, an ontology contract which defines PII that may be traded in the system, and an IDV (identification validator) registry 500 which defines what validators are registered in the system as well as a digital "fingerprint" of their associated metadata, for example their public key. In some examples, any of these kinds of contracts can be used concurrently with or instead of token contract 314 and pricing contract 312. In some examples, validator 100 is incentivized to maintain their self-defined accuracy or level. This is achieved by requiring that validator 100 pays a penalty to the system if requester 116 indicates a belief that validator 100 has attested erroneously. In some examples, requester 116 indicates a belief that validator 100 has attested erroneously by setting a flag, raising a flag, changing the status of a binary field, or any other indication as is known in the art. In some implementations, the penalty paid to the system is linked to the flagging process of requester 116, that is the penalty is paid when the requester flags or otherwise signals a belief that the validator has attested erroneously. In some examples, validator 100 will pay this penalty out of a stake of tokens or currency or other exchangeable value, referred to generally as 'tokens'. In some examples, to use the system, validator 100 must maintain a minimum stake of tokens defined by smart contracts 310 or other system rules related to tokens.

Figure 4A:
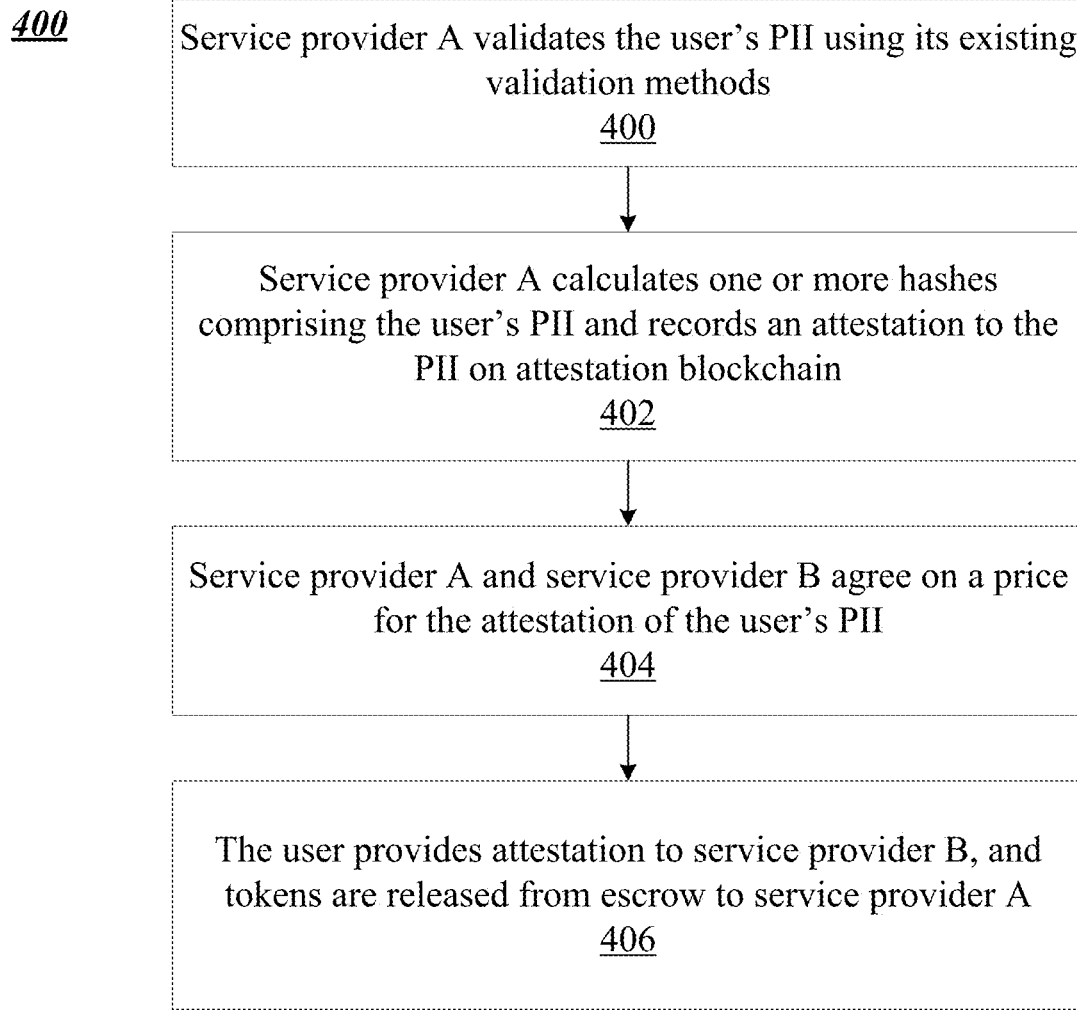
FIG. 4A shows one embodiment of a method performed by a service provider A acting as a validator in a system for attestations.

In general overview, FIG. 4A illustrates a method that may be performed by service provider A 302 acting as a validator in system 300. In a general overview of FIG. 4A, in step 400, service provider A 302 validates user 102a's PII using its existing validation methods. In step 402, service provider A 302 calculates one or more hashes comprising the user's PII and records an attestation to the PII on attestation blockchain 114. In step 404, service provider A 302 and service provider B 304 agree on a price for the attestation of the user 102a's PII. Following transmission of PII between user 102a and requester 116, in step 406 tokens are transferred to service provider A.

Referring to FIG. 4A in more detail, in some embodiments, no prior attestation for user 102a's PII exists. Service provider A 302 validates user 102a's PII using its existing validation methods. In some examples, service provider A validates user 102a's PII using validation methods that are adopted by the system as acceptable validation methods. In some examples service provider A validates user 102a's PII using one or more validation methods that are specific to the type of PII of user 102a. For example, if the PII of user 102a is a birth certificate, service provider A may validate the birth certificate by consulting a birth records registry. In another example, if the PII of user 102a is a driver's license, service provider A may validate the driver's license by consulting a registry of licensed drivers maintained by a driver or motor vehicle registry. In some embodiments, PII of user 102a may be validated by service provider A by referencing information that is not the same as the PII of user 102a. For example, user 102a may provide their age to service provider A, and service provider A may validate user 102a's age by consulting a birth records registry to find the date of birth of user 102a, from which service provider A may calculate the age of user 102a.

Once service provider A has validated user 102a's PII, service provider A 302 calculates one or more hashes of user 102a's PII and records one or more attestations to that PII on attestation blockchain 114. In some embodiments, an attestation may also include supporting metadata, such as its verification or validation level, details related to service provider A's 302 process of validation, or indication of any applicable industry standards used for validation. In some embodiments, when implemented on a Bitcoin or other attestation blockchain 114, the blockchain transaction details of the attestation are provided to user 102a from service provider A 302, and user 102a stores metadata related to the attestation. In some embodiments, user 102a stores one or more of the attestation, transaction details of the attestation, and metadata related to the attestation on user device 306. In some embodiments, user 102a stores one or more of the attestation, transaction details of the attestation, and metadata related to the attestation using a digital wallet application on user device 306. In some embodiments, user 102a stores one or more of the attestation, transaction details of the attestation, and metadata related to the attestation using a cloud-based or otherwise remote digital wallet application, or optionally in any other cloud-based or remote storage. Metadata to the attestation may reference the transaction details on attestation blockchain 114.

Figure 4B:
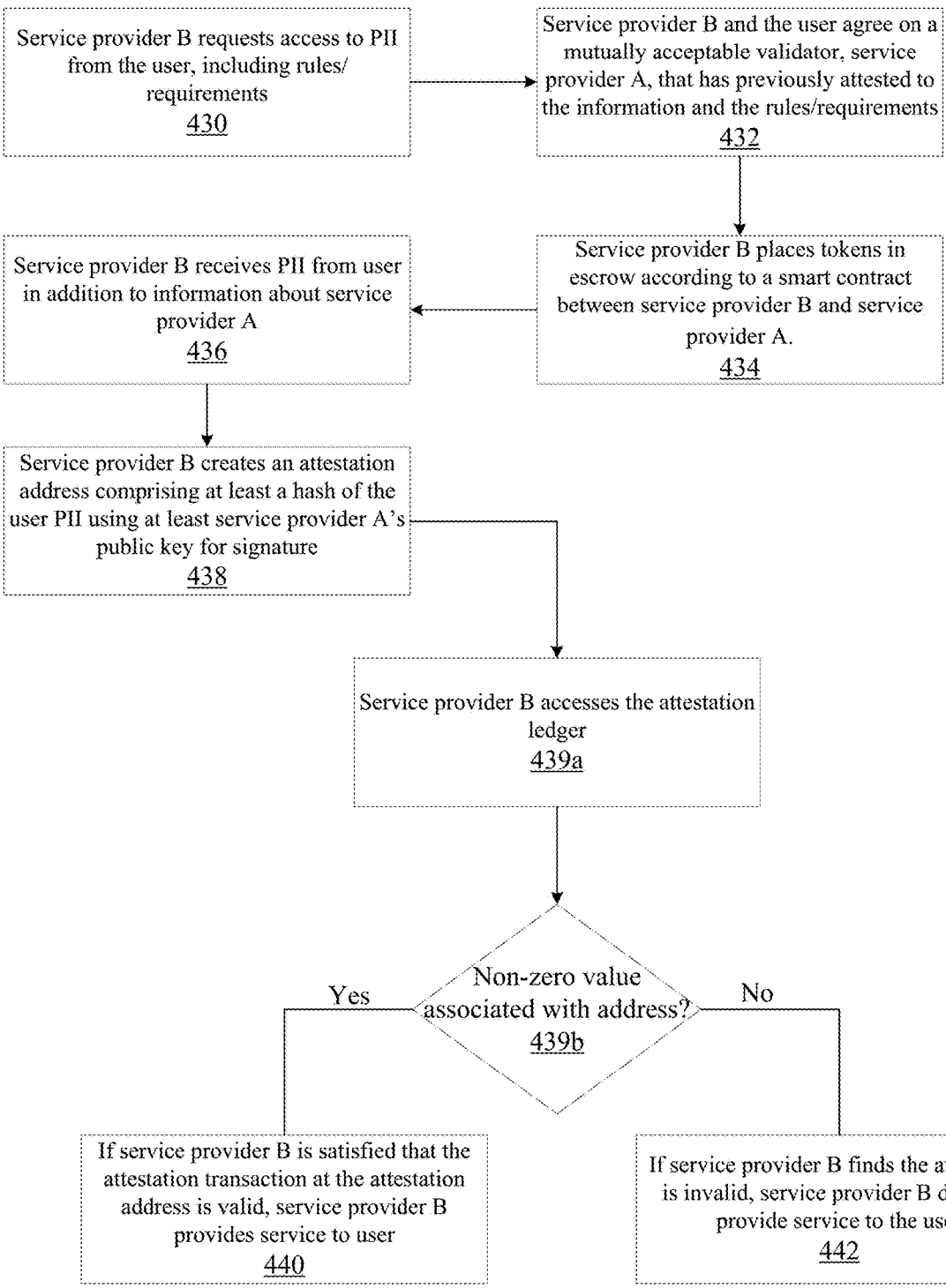
FIG. 4B shows one embodiment of a method performed by a service provider B acting as a requester in a system for attestations.

FIG. 4B illustrates an embodiment of a method that may be performed by service provider B 304 acting as a requester in system 300. In a general overview of FIG. 4B, in step 430, service provider B 304 requests access to all or certain portions of PII from user 102a, including any rules or requirements, for example rules and requirements with respect to what specific information service provider B 304 is willing to accept in fulfillment of the request. In step 432, service provider B 304 and user 102a agree on a mutually acceptable validator, service provider A 302, that has previously attested to the information and the rules/requirements around the information. In step 434, service provider B 304 places tokens in escrow according to a smart contract 310 between service provider B 304 and service provider A 302. In step 436, service provider B 304 receives PII from user 102a in addition to information about service provider A 302. In step 438, service provider B 304 creates an attestation address comprising at least a hash of user 102a's PII, and using at least service provider A's public key for signature, and in some examples service provider B 304 verifies that the attestation transaction at the attestation address on attestation blockchain 114 has not been revoked. In step 440, if service provider B 304 is satisfied that the attestation transaction at the attestation address has not been revoked, service provider B 304 provides the good or service to user 102a. In step 442, if the attestation cannot be found on the ledger or the attestation is revoked, service provider B 304 does not proceed with providing service to the user. In some implementations, service provider B 304 may report an error to a validator, a requester, the user, or another entity. This may allow the user to reenter information (for example, if the attestation was not found due to an error in entry of the information used to generate the attestation address), or may allow the validator to review entries in case information was incorrectly entered when establishing the attestation transaction.

Referring to FIG. 4B in more detail, in step 430, in some embodiments, an identity verification application on user 102a's device 306 may determine whether the requirements stipulated by service provider B 304 are met with the PII that is sent to service provider B 304 by user 102a. In some embodiments, an identity verification application at service provider B may determine whether the requirements stipulated by service provider B 304 are met with the PII that is received by service provider B from user 102a. In some embodiments, if the PII sent by user 102a to service provider B 304 does not meet the rules or requirements, service provider B will send a further request to user 102a specifying what different or additional information service provider B requires.

In step 432, service provider B and the user agree on a mutually acceptable validator. In some embodiments, service provider B has a white list of acceptable validators and sends the whitelist to user 102a. In some embodiments, user 102a and service provider B have whitelists of acceptable validators identity verification applications, for example an identity verification application on user device 306. In some embodiments, service provider B will choose a validator that is present on both user 102a's whitelist and service provider B's whitelist. In some examples, an identity verification application on device 306 of user 102a, or service provider B 304 will choose one of several mutually acceptable validators. In some embodiments, service provider B 304 will choose a mutually acceptable validator that has an acceptable level. In some embodiments, service provider B 304 will choose a mutually acceptable validator for which the payment for a correct validation is below a specific threshold.

In step 434, service provider B 304 places tokens in escrow according to a smart contract between service provider B 304 and service provider A 302. In some examples, service provider B places tokens in escrow prior to receiving information from service provider A that is necessary to create the attestation address associated with the PII from user 102a. For example, in some embodiments, service provider A only provides the public keys necessary for service provider B to create the attestation address after service provider B places the tokens in escrow.

In step 436, service provider B 304 receives PII from user 102a in addition to information about service provider A 302. In some embodiments, service provider B receives PII from user 102a before placing tokens in escrow for service provider A 302, and only receives information about service provider A 302 from user 102a after the tokens are placed in escrow. In some embodiments, user 102a PII and/or information about service provider A is released to service provider B upon placing tokens in escrow according to a smart contract on marketplace blockchain 250. In some embodiments, user 102a sends PII in plain text to service provider B 304. In some embodiments, user 102a's PII is sent from user 102a to service provide B 304 using a secure or encrypted tunnel. In some examples, user 102a PII is sent from an identity verification application on user device 306 to an identity verification application at service provider B. In some embodiments, user PII is sent in plain text. In some embodiments, user PII is sent using a QR code which is sent by the identity verification application on user device 306 and received by the identity verification application at service provider B. The QR code may be visually displayed on a display of user device 306 and may be scanned by a QR code scanner at service provider B.

In step 438, service provider B 304 creates or re-creates or re-calculates an attestation address comprising at least a hash of the user PII and using at least service provider A's public key. In some embodiments, service provider B creates an attest key using a hash of the user PII combined using elliptic curve addition with the user 102a's public key. In some embodiments, service provider B creates an attestation by signing the attest key with at least user 102a's public key and service provider A's public key and one or more third-party public keys using a multisig protocol. In some examples, a third-party key may be associated with a digital wallet controlled by user 102a. Service provider B may find the attestation address on attestation blockchain 114 and verify that the transaction at the attestation address has not been revoked, confirming the authenticity of the requested user 102a PII.

In step 440, if service provider B 304 is satisfied that the requested PII of user 102a is authentic, then the tokens corresponding to the price of that attestation are released from escrow to service provider A. In some embodiments, the tokens are placed into escrow via the smart contract 310 before the user transmits the PII and service provider B can verify user 102*a*'s PII. If a verification is not successful, service provider B may be able to receive a refund of some or all of the tokens back into its account.

Figure 4C:
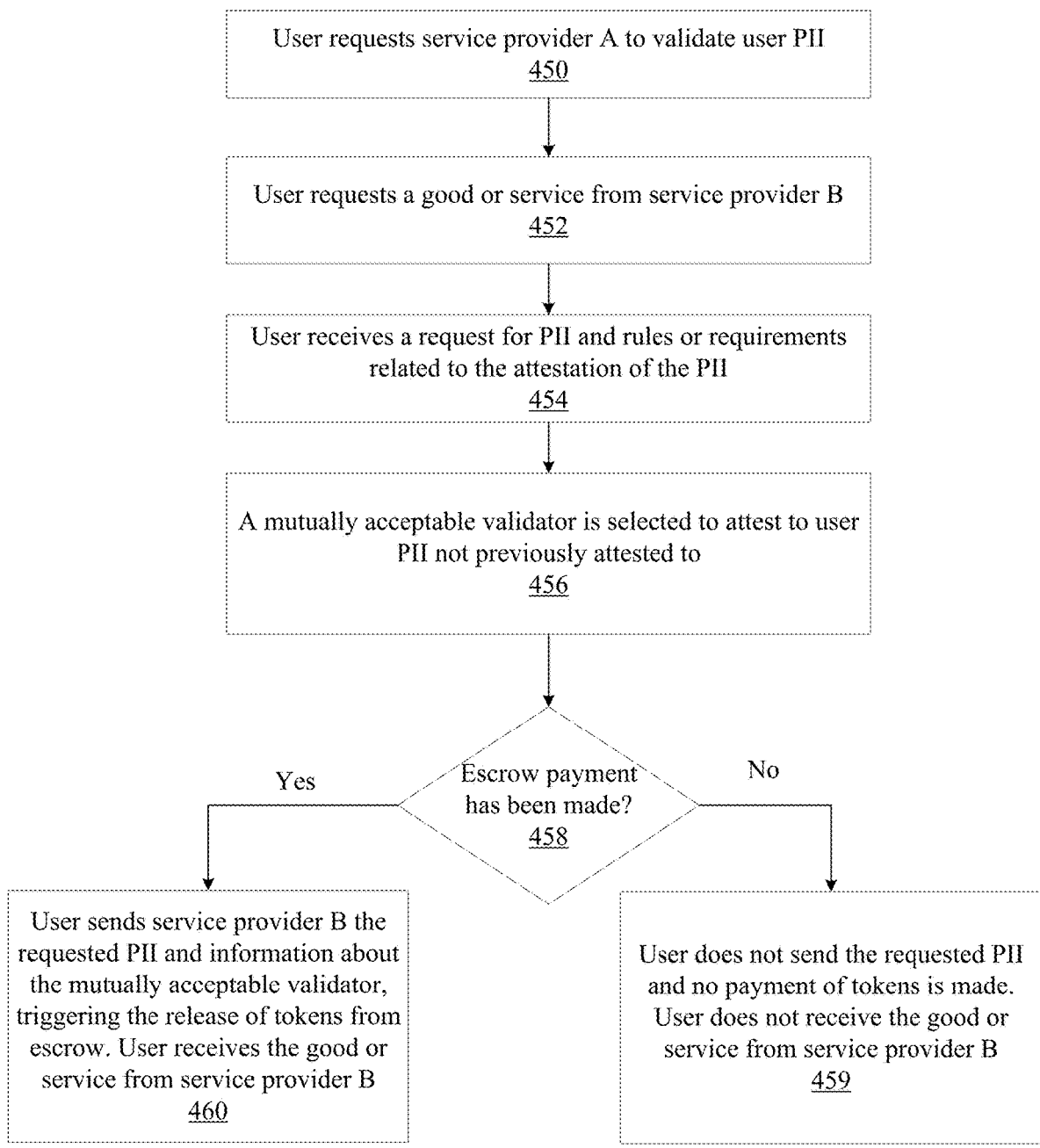
FIG. 4C shows one embodiment of a method performed by a user requesting goods or services in a system for attestations.

FIG. 4C illustrates a method that may be performed by user 102*a* in system 300. In step 450, user 102*a* requests service provider A 302 to validate user PII. In step 452, user 102*a* requests a good or service from service provider B 304. In step 454, user 102*a* receives a request from service provider B 304 acting as a requester (such as requester 116), for PII as well as rules or requirements relating to the attestation of the requested PII. In step 456, a mutually acceptable validator that has previously attested to user 102*a*'s PII according to the rules/requirements related to the PII is selected. In step 458, after the user verifies that an escrow payment exists or has been made, user 102*a* sends service provider B 304 the requested PII and information about the mutually acceptable validator which may trigger the release of tokens from escrow. In some embodiments, the tokens are released to at least one of user 102*a*, the mutually acceptable validator, or system 300. In step 460, user 102*a* receives the good or service from service provider B 304.

Referring to FIG. 4C in more detail, in some embodiments of step 454, after user 102*a* applies for a product or service from service provider B 304, user 102*a* receives rules and regulations from service provider B 304 related to the PII that service provider B has requested. In some embodiments, the PII that service provider B has requested is related to the product or service requested by user 102*a*. In other embodiments, the PII that service provider B has requested may not be related to the product or service requested by user 102*a*. The requested PII may vary depending on the geographic location of service provider B. In some examples, rules and regulations received by service provider B indicate one or more validators that are acceptable to service provider B. In some embodiments, the one or more validators that are acceptable to service provider B may be different depending on the good or service requested by user 102*a*.

In some examples, where some or all of the PII that service provider B has requested from user 102*a* has not been attested to by a validator of the one or more validators that are acceptable to service provider B, in step 456 user 102*a* selects a mutually acceptable validator to attest to any PII not previously attested to. In some examples, the PII may have been previously attested to by a validator that is not acceptable to service provider B. The PII may not have been attested to by any validator. The user may perform steps as previously described to have PII that was not attested to by a validator acceptable to service provider B, attested by a validator that is one of the one or more validators that are acceptable to service provider B.

In step 458, user 102*a* may verify that service provider B has placed tokens in escrow. In some embodiments, the escrow may be stored at an address on attestation blockchain 114 or marketplace blockchain 250. In some examples, requester 116 may send the blockchain address at which the escrow payment is stored to user 102*a* such that user 102*a* may validate that the escrow payment has been made. In some embodiments, the transaction with which requester 116 stores an escrow payment on attestation blockchain 114 or marketplace blockchain 250 may be signed using a multisig protocol that includes at least a public key of requester 116 and user 102*a*. In some embodiments, the escrow payment transaction may be signed with at least the public key of requester 116, user 102*a*, and a validator 100 that is acceptable to requester 116. In some embodiments, user 102*a* may indicate to requester 116, which one or more acceptable validators has attested to PII that requester 116 indicated is required, and one or more escrow payments may be paid into one or more escrow accounts, in some embodiments utilizing one escrow account for each validator that has attested to any portion of the requested user PII.

In some embodiments, in step 458 user 102*a* may verify that service provider B has placed tokens in escrow. In some examples, user 102*a* may verify that tokens have been placed in escrow before user 102*a* performs steps to have PII that was not attested to by a validator acceptable to service provider B, attested to by a validator that is one of the one or more validators that are acceptable to service provider B. In some embodiments, user 102*a* may verify that service provider B has placed tokens in escrow before user 102*a* requests a good or service from service provider B. In some embodiments, user 102*a* may verify that service provider B has placed tokens in escrow once user 102*a* has received rules and regulations from service provider B. In some embodiments, user 102*a* verifies that service provider B controls at least enough tokens as may be required for service provider B to access one or more attestations created by one or more validators in order to verify the requested information of user 102*a*.

User 102*a* may send the required PII from the identity verification application on the user's device 306. In some embodiments, user 102*a* may send service provider B 304 the requested PII and the necessary information (e.g. required attestation metadata) for the requested PII, in order for service provider B 304 to reconstruct a hash or Merkle root using the PII of user 102*a*, create an attestation address and verify it against attestation blockchain 114. In some embodiments, once service provider B 304 has paid tokens into escrow, user 102*a*, through their identity verification application on user device 306, can send service provider B 304 the PII (which in some applications may be encrypted) with the information necessary to create the attestation address on attestation blockchain 114. Service provider B 304 may then create an attestation address utilizing the PII sent by user 102*a*. In some examples, service provider B 304 reconstructs a hash (for example but not limited to a Merkle tree hash) from the provided PII. In some examples, service provider B creates an attestation address using the PII and the required attestation metadata provider by user 102*a*. and checks the validity of a transaction at that attestation address on the attestation blockchain 114. Service provider B may perform these steps one or more times, the number of times corresponding to the number of validators that have validated any part of the requested PII from user 102*a*.

In step 459, if the escrow payment has not been made, user 102*a* does not send the requested PII to requester 102*a*. In some examples, no payment of tokens is made by user 102*a* to requester 116 for the requested good or service, and user 102*a* does not receive the good or service from service provider B.

In step 460, user 102*a* sends service provider B the requested PII and information about the mutually acceptable validator, triggering the release of tokens from escrow. In some embodiments, user 102*a* may receive the goods and services before the tokens are released from escrow. In some embodiments, the tokens may be shared between user 102*a* and service provider A 302 at a ratio defined by smart contract 310. In some embodiments, service provider B 304 offers a certain price in the escrow contract with service provider A. In some embodiments, service provider A 302 may advertise a price in the escrow contract. In some embodiments, system 300 receives a fee, for example a transaction fee, from the tokens that are released from escrow. In some examples, user 102*a* will send information to service provider B once they see that the payment was received into escrow. In some embodiments, an identity verification application on user device 306 will transfer this information to service provider B once the identity verification application receives confirmation that service provider B 304 has paid the required tokens into escrow.

Figure 5:
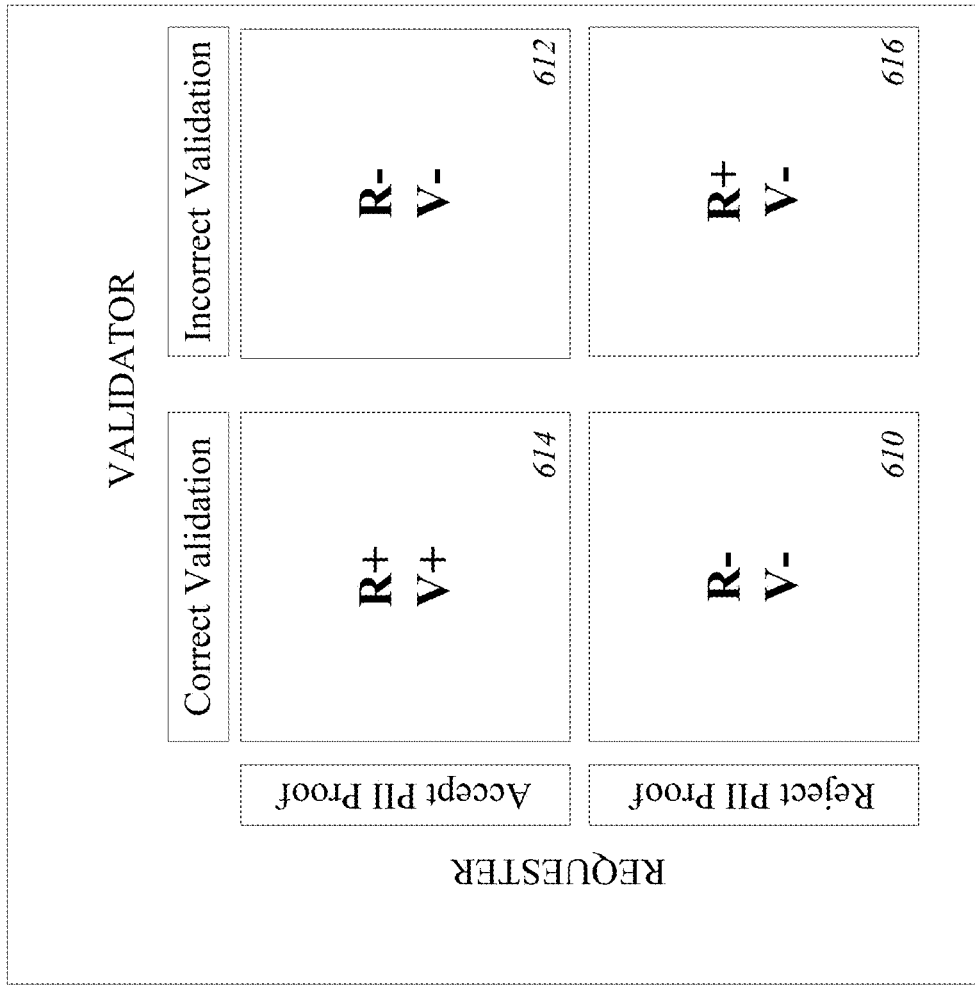
FIG. 5 shows an illustration of the system's goals in some embodiments.

In general overview, FIG. 5 shows an illustration of the system goals. For correct operation of the system, it is desirable to provide incentives (rewards) and disincentives (penalties) to requesters of PII and to validators of PII such that overall, the likelihood of correct validations being provided by validators (and accepted by requesters) is increased, and such that the likelihood of incorrect validations being provided by validators is reduced.

In one embodiment shown in FIG. 5, R represents the requester, V represents the validator, '+' represents a reward for behavior in the system, and '-' represents a penalty for behavior in the system. The purpose of incentives is to achieve equilibrium states, where correct validations of PII that are accepted by requesters lead to rewards to both the validator and the requester, while incorrect validations of PII that are correctly rejected yield requester rewards and validator penalties, thereby increasing the overall system reliability and accuracy of PII attestations that are ultimately used by the requester.

This type of system may be described using game theory. In game theory, a non-cooperative game is a game with competition between individual players and in which only self-enforcing alliances are possible due to the absence of external means to enforce cooperative behavior. Non-cooperative game theory focuses on predicting which coalitions will form, the joint actions that groups take and the resulting collective payoffs. A Nash equilibrium is a solution concept of a non-cooperative game involving two or more players in which each player is assumed to know the equilibrium strategies of the other players, and no player has anything to gain by changing only their own strategy. If each player has chosen a strategy and no player can benefit by changing strategies while the other players keep theirs unchanged, then the current set of strategy choices and the corresponding payoffs constitute a Nash equilibrium. The Nash equilibrium provides a way of predicting what will happen if two parties are making decisions at the same time, and if the outcome depends of the decisions of each other.

Referring to FIG. 5 in more detail, the requester is rewarded when the requester accepts a correct validation provided by the validator or when the requester correctly rejects an incorrect validation provided by the validator. The validator is rewarded only when the validator provides a correct validation, and this is accepted by the requester. A Nash equilibrium of the game (whereby no participant in the game can gain an advantage by unilaterally changing their strategy if the other participants maintain their strategies) exists in the system when the validator provides a correct attestation and the requester accepts the correct attestation.

Figure 6A:
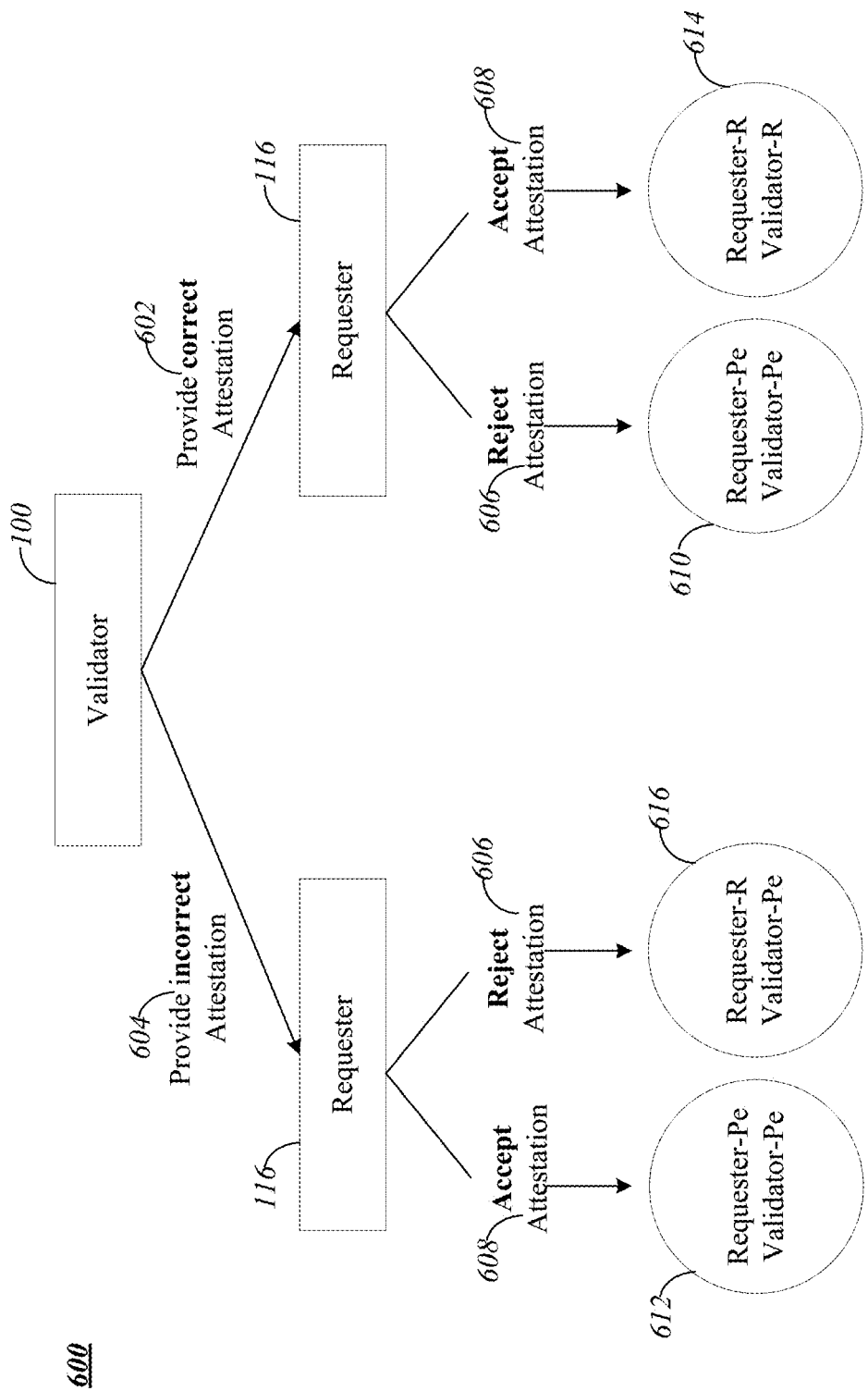
FIG. 6A shows a form of the interaction between requester and validator, according to some embodiments.

FIG. 6A shows a form of an interaction between requester 116 and validator 100. To create an identity system that exhibits a high level of accuracy, the system makes use of incentives that reward accuracy, and penalties that discourage acting falsely. If the system becomes unreliable or unpredictable, then requesters may avoid using it. The user may be removed from the design of incentives in the identity system, because it is assumed that validators treat all user's PII submissions as false, which is why they set out to validate them in the first place. It is the role of the validator to ensure the accuracy of their attestations of user PII. This reduces the system to a two-player game comprising a validator and a requester. In this system, the validator provides the requester with an attestation, where the attestation is either correct or incorrect. The requester reviews the attestation and has two options—either to accept or reject it. The requester must be adequately incentivized to reject an incorrect attestation and to accept a correct attestation. In both cases, the outcome for the requester is "R" (reward). However, the outcome for the validator depends on whether a correct attestation was provided ("CA"—reward) or not ("Pe"—penalty). There is no information available regarding whether the validator has provided an incorrect or correct attestation, other than if the requester rejects it. This has the effect that the reward "R" can never be greater than the utility of a correct attestation ("CA").

Figure 6B:
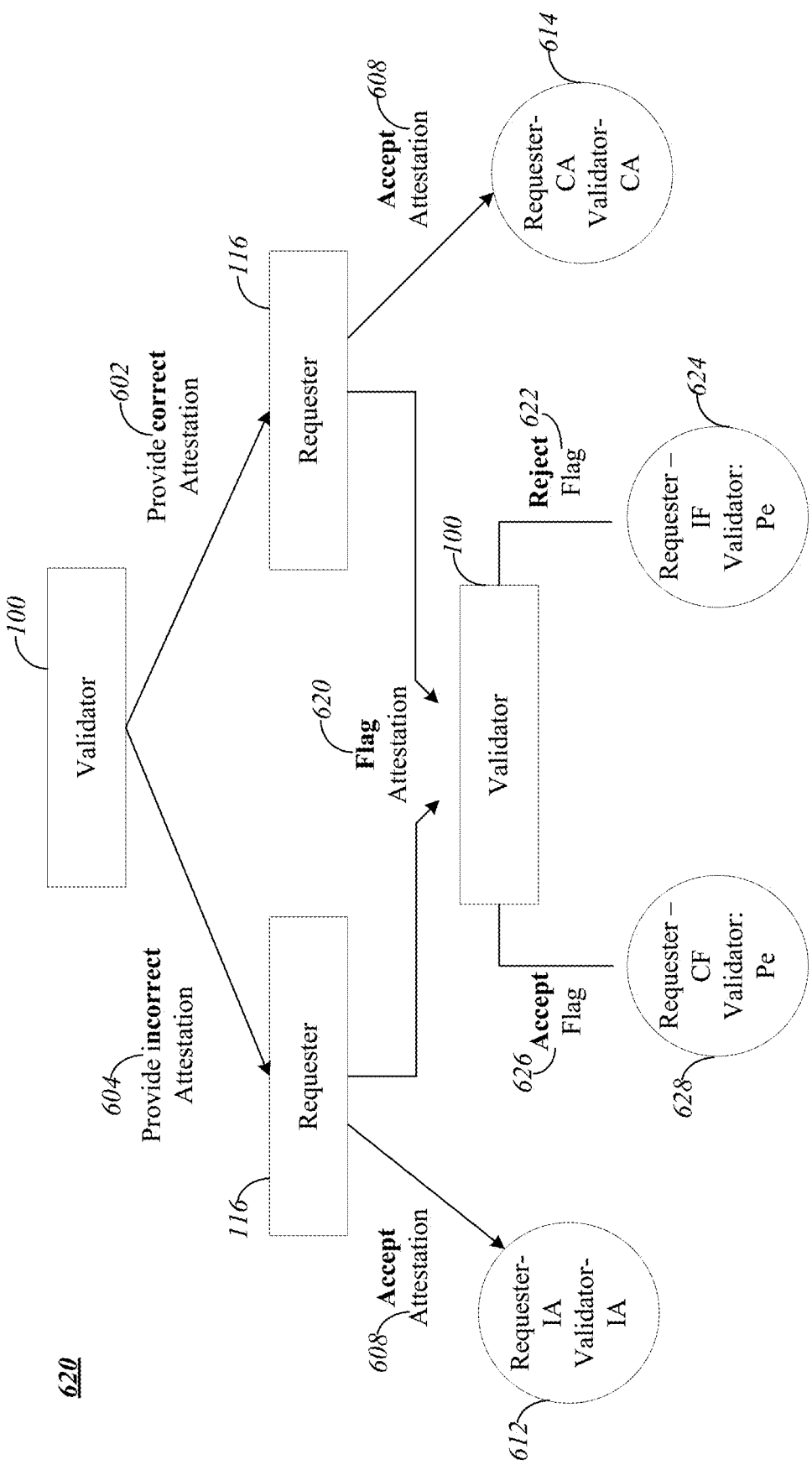
FIG. 6B shows an extended form of the interaction between requester and validator, according to some embodiments.

No independent party can verify whether an attestation provided by a validator is correct or incorrect. Hence, in one embodiment, incentives are built into the system through a more complex combination of decisions, flags, penalties and rewards that are used in repeated interactions between a validator and a requester in order to encourage the desired system behavior. FIG. 6B shows one such example of an extended form of the interaction between requester 116 and validator 100. Requester 116 reviews validator 100's attestation and has two options, to either flag the attestation as incorrect or accept the attestation. If validator 100 provides an incorrect attestation 604, and requester 116 accepts this attestation 608, the outcome for both the validator and requester is a penalty (PE)—to the validator for providing an incorrect attestation and to the requester for accepting an incorrect attestation 612. If validator 100 provides a correct attestation 602 and requester 116 accepts the attestation 608, the outcome for both the requester and validator is a correct attestation and the outcome for both validator 100 and requester 116 is a reward (CA), to validator 100 for providing a correct attestation and to requester 116 for accepting a correct attestation 614. Note that these rewards and penalties may not necessarily be in tokens—for example, the penalty for accepting an incorrect attestation by the requester may be providing the good or service to the user, based on the incorrect user information, resulting in unauthorized access, improper provisioning of goods, etc.

If requester 116 flags any attestation as incorrect 620, then validator 100 makes a further decision; it can either accept 626 or reject 622 the flag 620. The assumption is that validator 100 will only accept correct flags and only reject incorrect flags. The basis for this assumption relies on the honesty of validator 100, who is motivated to improve robustness of the system since validator 100 penalties are same for both cases, i.e. whether the validator accepts or rejects the flag.

'Correct flag' (CF) is the reward to requestor 116 for a correct flag and 'incorrect flag' (IF) is the reward to requester 116 for an incorrect flag. If validator 100 provides an incorrect attestation 604 and requester 116 flags this attestation 620, validator 100 accepts this flag 626. The outcome for the requester 116 is a CF reward, and the outcome for validator 100 is a penalty PE 628. If validator 100 provides a correct attestation 602 and requester 116 flags the attestation 620, validator 100 rejects the flag 622. The outcome for requester 116 is an IF penalty and the outcome for validator 100 is a penalty PE 628.

Referring to FIG. 6B in more detail, the penalty for validator 100 is kept the same regardless of whether validator 100 accepts or rejects a flag. This presumes that the primary non-financial motivation of validator 100 would be to make the system more robust. This would therefore incentivize honesty through accepting a flag if it is indeed an incorrect attestation, since it costs validator 100 the same regardless. However, since the penalty is the same regardless of whether the validator 100 accepts or rejects a flag, validator 100 could also potentially reject correct flags to discourage requesters 116. A weighing factor "w" can be raised once it is determined that validator 100 is not incentivized to continuously reject correct flags.

The four game outcomes of FIG. 6B can be reduced into a simplified normal form. An attestation game is a sequential game with two actors, a requester and a validator operating in an outcome space represented as a tuple of utility gains (Requester; Validator). The four game outcomes of FIG. 6B are {Correct Attestation; Correct Attestation (CA; CA) 614, Incorrect Attestation; Incorrect Attestation (IA; IA) 612, Correct Flag; Penalty (CF; Pe) 628, Incorrect Flag; Penalty (IF; Pe) 624}. In some embodiments, a Fee is given by the requester to the validator for the game to be initiated, CF is the reward for a correct flag and IF is the reward for an incorrect flag.

The following constraints (Proposition 1) produce an exclusive Nash equilibrium of (CA; CA):

$$CA > IF > IA | CA, IF, IA \in \mathbb{R}$$

$$CF > IA | CF, IA \in \mathbb{R}$$

1. (CA; CA): The requester and validator would remain here. Because CA>IF and CA>IA, this scenario produces more utility for both. Therefore (CA; CA) is a Nash equilibrium.
2. (IF; Pe): The requester would want to move to (CA; CA) to maximize utility given the validator's action and the validator is indifferent given the requester's action. Therefore, this is not a Nash equilibrium.
3. (IA; IA): The requester would want to move to (CA; CA) since CA>IA and so would the validator. Therefore, this is not a Nash equilibrium.
4. (CF; Pe): The requester would want to remain since CF>IA and the validator is indifferent; it cannot be guaranteed he would not want to move to (IF; Pe). Therefore, this is not a Nash equilibrium.

This demonstrates that (CA; CA) is the only Nash equilibrium.

If CF, IF≤IA, there is no incentive for the requester to flag the attestation. In a repeated game, if the expected reward from flagging is larger than CA then the requester should flag all attestations, with the addition of additional qualitative constraints:

1. CF, IF≤|Pe|, since the reward is paid out from the penalty Pe.
2. IA>Pe, since this is additional discouragement for the validator to provide an incorrect attestation, as the cost of a penalty is greater than the cost of the incorrect attestation being accepted.
3. Fee<|Pe| to ensure that the penalty a validator faces is always larger than the Fee it charges, disincentivizing it from providing incorrect attestations while still making a profit.

We assume IA<0 since the consequences of accepting invalid user data (reputationally and/or financially due to a fine) would outweigh any short-term convenience.

An attestation game is well-posed if the constraints in Proposition 1 and the qualitative constraints are both satisfied. In other words:

$$CA > IF > 0 > IA > Pe$$

$$CF > IA \text{ and } CF, IF, Fee \leq |Pe|$$

Given always rational actors in a well-posed attestation game and P(IA) being the probability of a validator providing an incorrect attestation, the probability of a validator providing a correct attestation is P(CA)=1−P(IA). Then P(CF):=P((CF; Pe))=P(IA) and P(IF):=P ((IF; Pe))=P(CA).

If the validator provides an incorrect attestation, then the requester's choices are to accept it, for a utility gain of IA or to flag it for a utility gain of CF. Since CF>IA and the requester is always rational, the requester will always choose to flag it. Therefore P(CF|IA)=1, so P(CF)=P(CF|IA)P(IA) =P(IA). A similar argument holds for P(IF)=P(CA).

In some embodiments, the reward function Re is a discrete random variable over {(CF; Pe); (IF; Pe)}. With Re ((CF; Pe))=CF and Re ((IF; Pe))=IF. Its probability mass function is given by $$\begin{cases} P(CF) = P(IA) \text{ if } Re = CF \\ P(IF) = P(CA) \text{ if } Re = IF \end{cases}$$

In some examples. define R as the expected value of Re, that is $$R := E[Re] = P(CF)CF + P(IF)IF$$

A reward function Re (with E[Re]=R) is well-posed if:

$$IA < R < CA \text{ and } R < |Pe|$$

IF and CF are chosen in such a way that Re is well-posed. The required network incentives are created through a proof-of-stake mechanism making use of the token.

P is the probability of a correct attestation (P(CA)) and $$Level = \frac{1}{1-P}$$

P is determined by the validator and in some examples can also be considered as the validator's accuracy. In some examples, level is representative of the total number of attestations the validator can expect to supply per incorrect attestation.

In some embodiments, different confidence levels of accuracy are required for different applications. For example, confidence levels greater than 99.9% may be required for critical use cases. Lower confidence levels may be acceptable for less critical use cases. In some examples, it is more costly for a validator to authenticate user PII to a higher confidence level. The system many include many validators that can provide different levels of accuracy, with associated adjustments in prices per attestation. In some embodiments, the system includes penalties for validators that create attestations that are not truthful, creating strong incentives for validators to be accurate and truthful.

In general overview, FIG. 7 illustrates sample levels of different validators. Requesters must be confident that validators will maintain a level of accuracy required for their use cases. The identity system of this invention is a decentralized system, and the enforcement of accuracy cannot be achieved through a central authority and must instead rely on rewards and penalties. The incentives required to drive the system towards accuracy are created using a branch of game theory called backward induction. In backward induction, the end goal is decided and then a game is designed to attempt to reach this goal.

Rewards and Penalties

Figure 8:
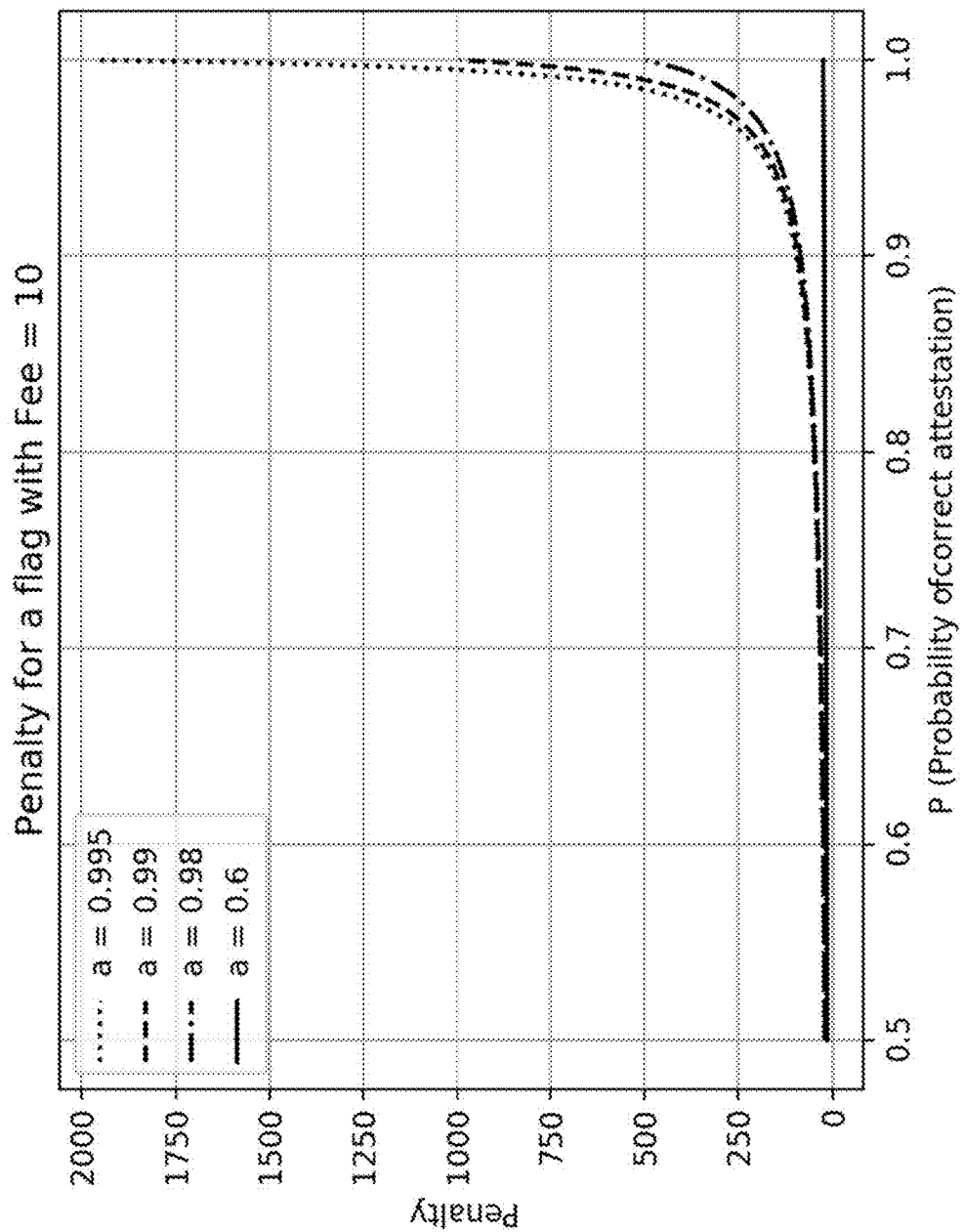
FIG. 8 illustrates the penalty for a flag as the level varies for different values of a system constant (a), according to some embodiments.

In general overview, FIG. 8 illustrates the penalty for a flag as the level varies for different values of a system constant (a).

It is proposed that a penalty Pe satisfies the conditions for a well-posed attestation game and subsequently the rewards for a correct flag (CF) and incorrect flag (IF) which produce a well-posed reward function Re.

$$Pe = -\frac{Fee}{1-aP}, a\in[0, 1]$$

a is a configurable parameter that can be adjusted if observations indicate penalties are too high or too low. Fee≤|Pe|, in other words the above Pe is valid for a well-posed attestation game. It is noted that $$0 \leq aP \leq 1 \Rightarrow 0 \leq 1 - aP \leq 1 \Rightarrow \frac{1}{1-aP} \geq 1.$$

So $$|Pe| = \frac{Fee}{1-aP} \geq Fee$$

In the rewards CF and IF, the process introduces a weighting factor to include a dependence on the flagging history of the requester. Should a requester have a high ratio of previously accepted flags, it should produce a higher reward. This incentivizes the requester to only submit flags if they are likely to be accepted (i.e. incorrect attestations).

AF is defined as the ratio of accepted flags to the total flags in its history. Clearly 0≤AF≤1. w∈[0,1] is defined as the weight parameter to indicate how much AF should be weighted in the rewards. w is configurable based upon the behavior of the system.

The reward for setting a correct flag CF is defined as $$CF = [w + (1-w)AF] \cdot \frac{|Pe|}{2}$$

and the reward for an incorrect flag IF is $$IF = [w + (1-w)AF] \cdot \frac{|Fee|}{2}$$

By definition CF, IF≤|Pe| and therefore are valid for a well-posed attestation game. For future purposes express CA=Fee+S where S>0 is any savings gained by using the system. We can see 0<IF<Fee<CA as required. Re can be defined and the formula for R=E(Re) becomes:

$$R = [w + (1-w)AF] \cdot P(IA) \cdot \frac{|Pe|}{2} + [w + (1-w)AF] \cdot P(CA) \cdot \frac{|Fee|}{2}$$

This formula can be simplified to $$R = \frac{1}{2}[w + (1-w)AF] \cdot \left[P(IA) \cdot \frac{Fee}{1-aP} + P(CA) \cdot Fee\right]$$

R, as defined, can be shown to be well posed:

$$\rightarrow 0 \leq P(CA), P(IA) \leq 1$$

as they are probabilities, and $$P(CA) = 1 - P(IA)$$

$$\rightarrow w + (1-w)AF \leq w + (1-w) = 1 \text{ since } 0 \leq AF \leq 1$$

$$\rightarrow w + (1-w)AF \leq w + (1-w) = 1 \text{ since } 0 \leq AF \leq 1 \text{ by definition.}$$

$$\rightarrow aP \leq P \Rightarrow 1 - P \leq 1 - aP \Rightarrow \frac{1}{1-aP} \leq \frac{1}{1-P}$$

$$\rightarrow \frac{1}{1-P} = \frac{1}{P(IA)}$$

For R to be well posed it needs to satisfy the constraints previously stated:

$$IA < R < CA \text{ and } R < |Pe|$$

$$R = 1/2[w + (1-w)AF] \times \left[P(IA) \cdot \frac{Fee}{1-aP} + P(CA) \cdot Fee\right] \leq$$

$$1/2\left[P(IA)\frac{Fee}{1-P} + P(CA)Fee\right] = 1/2[Fee + P(CA)Fee) \leq$$

$$1/22Fee = Fee < Fee + S = CA.$$

Thus, the constraint R<CA is satisfied. Additionally, since IA<0, then $$R = 1/2[w + (1-w)AF] \times \left[P(IA) \cdot \frac{Fee}{1-aP} + P(CA) \cdot Fee\right] \geq 0 > IA$$

The final requirement is that R<|Pe|:

$$R \leq \left[P(IA) \cdot \frac{Fee}{1-aP} + P(CA) \cdot Fee\right] \leq \left[P(IA) \cdot \frac{Fee}{1-aP} + P(CA) \cdot \frac{Fee}{1-aP}\right] \leq [P(IA) + P(CA)] \cdot \frac{Fee}{1-aP} = \frac{Fee}{1-aP} = |Pe|$$

The parameter "a" adjusts the penalty and FIG. 8 illustrates how it influences this.

The reward scales with how many previous flags have been accepted. Therefore, the requester is also incentivized to be honest when flagging in a repeated game scenario. Even when a requester has had all its previous flags rejected, it is still incentivized to flag an incorrect attestation as there is a non-zero minimum reward (dictated by the weight parameter w). This is a feedback mechanism i.e. if a requester has a high ratio of accepted flags (due to having a high rate of previously accepted flags), and decides (for whatever reason, even though it will always be lower than CA as shown above) to flag correct attestations, it will be rejected, and future rewards will be lower.

Since |Pe|>R in all scenarios, there will be excess incentive amounts |Pe|−R. In some embodiments, these incentive amounts may be locked away separately (not using a centralized solution). In some examples, the instance a validator accepts a flag, these incentive amounts will be used to pay out all previous requesters who accepted that attestation or will be distributed to all validators.

In a repeated game, which this is, it can then be shown that regardless of the discount factor (the discount of future game utility as is known in the art), the correct behavior is incentivized.

With a well-posed R in a repeated game with discount factor β<1, accepting correct attestations (honest) is more profitable than always flagging correct attestations (dishonest).

Proof. The infinite geometric series identity holds β<1 for convergence:

Honest total payout:

$$\sum_{k=0}^{\infty} (CA)(\beta)^k = \frac{CA}{1-\beta}$$

Dishonest total payout:

$$\sum_{k=0}^{\infty} (CA)(\beta)^k = \frac{CA}{1-\beta}$$

Since R is well-posed, CA>R so:
Difference:

$$\frac{CA}{1-\beta} - \frac{R}{1-\beta} > 0$$

Staking Mechanism

Figure 9:
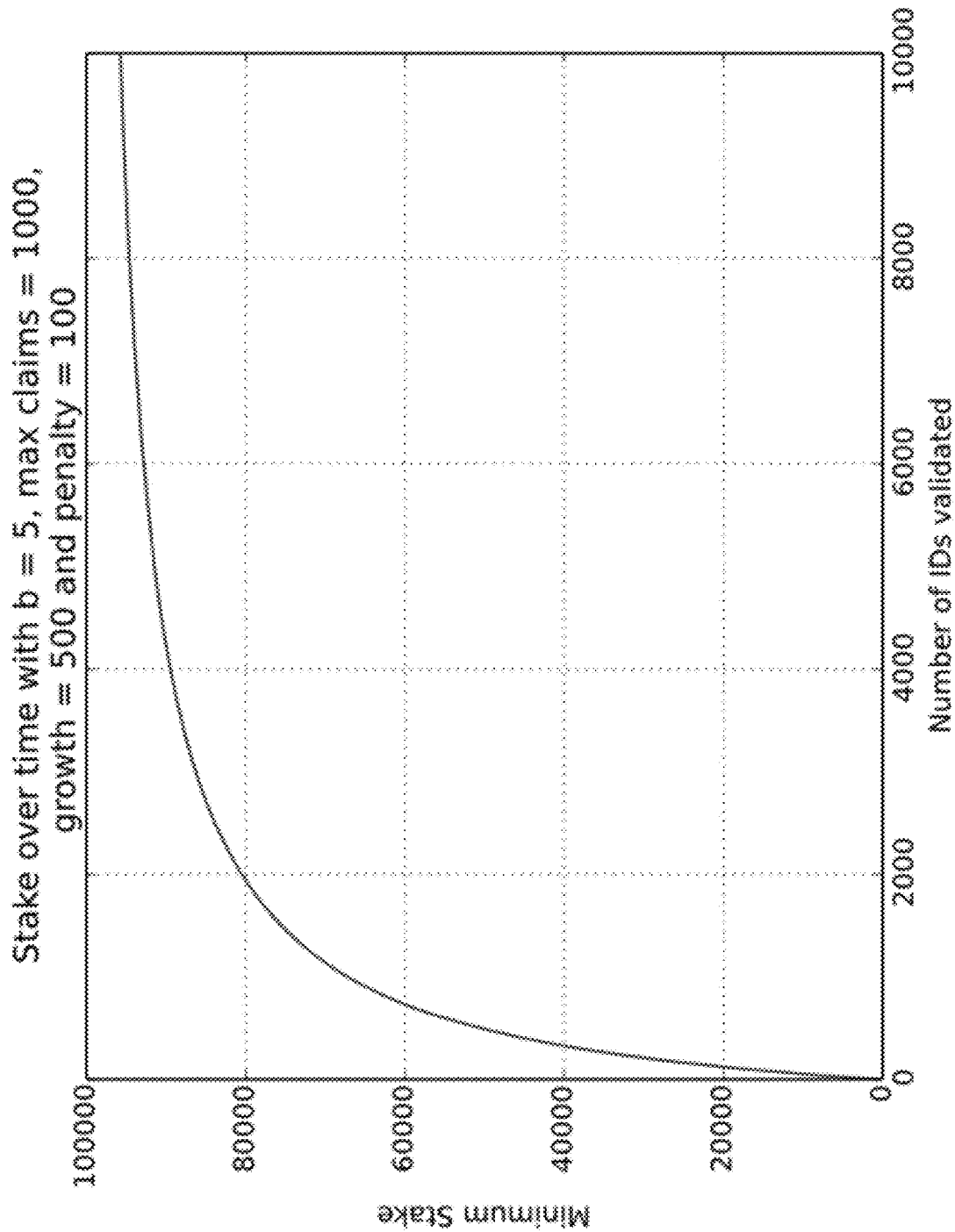
FIG. 9 illustrates the required stake of a validator with a penalty of 100 tokens per flag who performs 10,000 attestations, according to some embodiments.

In general overview, FIG. 9 illustrates the minimum required stake as more IDs are validated for a set of values. Specifically, FIG. 9 illustrates the required stake of a validator with a penalty of 100 tokens per flag who performs 10,000 attestations.

Referring to FIG. 9 in more detail, in order to ensure the right incentives are maintained, a staking mechanism is required. The staking mechanism requires a validator 100 to hold a defined minimum amount of tokens in order to be an active participant in the system. To ensure that validators have a stake and can pay, they must maintain a minimum stake that secures them against expected claims. This ensures that CA:CA is the Nash equilibrium in the repeated game.

The expected claims are:

$$EC = \frac{Total_{ID}}{Level_{average}}$$

Where $Total_{ID}$ is the number of IDs that the validator has provided to requesters and $Level_{average}$ is the average level of a validator's IDs.

A stake function $Stake_{min}: \mathbb{R} \to \mathbb{R}$ is feasible if:
1. $Stake_{min}(0) \geq b \cdot |Pe|$, to cover a base amount of flagged attestations b (configurable by the network and related to EC when it is a new validator).
2.

$$\lim_{x \to \infty} stake_{min}(x) = |Pe| \cdot Claim_{max} + O(b),$$

where $Claim_{max} \in \mathbb{R}$ represents the maximum amount of claims expected for a validator to reach.

3.

$$\frac{dStake_{min}}{dx} > 0 \text{ and } \frac{d^2 Stake_{min}}{dx^2} < 0$$

for x ∈ (0, ∞)

In other words, the minimum stake grows with diminishing additional costs to the validator. The current stake of a validator must always be greater than or equal to $Stake_{min}(Total_{ID})$.

The minimum stake ($Stake_{min}(Total_{ID})$) should be:

$$Stake_{min} = |Pe|\left(b + \frac{Claim_{max} \cdot Total_{ID}}{growth + Total_{ID}}\right)$$

Where growth ∈ [1, ∞) modulates how quickly the required stake grows as a function of the total number of attestations of the validator.

Proof

Proof · 1 · $Stake_{min}(0) = |Pe| \cdot b$ trivially as required.

2. Let $x = Total_D$. Then:

$$\lim_{x \to \infty} Stake_{min}(x) = \lim_{x \to \infty} |Pe| \cdot b + |Pe| \cdot \frac{Claim_{max}}{\frac{growth}{x} + 1} =$$

$$|Pe| \cdot b + |Pe| \cdot Claim_{max} = |Pe| \cdot Claim_{max} + O(b)$$

3. $\frac{d}{dx}\frac{x}{1+x} = \frac{1}{(1+x)^2}$ which is positive everywhere for $x \neq -1$.

4. $\frac{d^2}{dx^2}\frac{x}{1+x} =$ $$\frac{2x}{(1+x)^3} - \frac{2}{(1+x)^2} = \frac{-2x}{(1+x)^3}$$ which is negative ∀ $x > 0$ since $a^3 > 0, \forall a > 0$.

The stake, through including Pe as a variable, is linearly dependent on Fee. This ensures that the stake (and the penalty itself) adjusts to changes in the value of the token in the system since inflation or deflation of a token may be accompanied by a fee adjustment by a validator. This stake ensures that there is enough protection for requesters. If the validator decides to leave the system, the stake decays over time using an exponential function, where more tokens are available to be withdrawn over time in an exponential manner.

The withdrawal stake percentage is defined as $100e^{t-F}$, where t is the time in minutes since the withdrawal was requested, up to 5 years and F is five years in minutes. At 5 years, 100% of the stake will be withdrawn. After say one year, only 1.83% can be extracted by the validator. Both requesters and validators can also choose to use other parties e.g. requesters can decide which validator to use and validators can decide which requesters to accept.

An alternative stake definition which is not based on fee is considered a viable alternative to the staking definition described previously.

A stake function Stakemin: $\mathbb{R} \to \mathbb{R}$ is feasible if
1. $Stake_{min}(0) \geq b$, to ensure there is a base amount of stake b ∈ R from the moment of introduction of the validator.

2.

$$\lim_{x \to \infty} \text{Stake}_{min}(x) = O(\text{Stake}_{max})$$

where $\text{Stake}_{max} \in R$ loosely represents a scaling factor modulating the maximum amount of stake.

3.

$$\frac{d\text{stake}_{min}}{dx} > 0 \text{ and } \frac{d^2\text{Stake}_{min}}{dx^2} < 0 \text{ for } x \in (0, \infty).$$

In other words, the minimum stake grows with diminishing additional costs to the validator.

A new staking function is constructed with a modification from the original:

$$b + \frac{\text{Level} \cdot \text{Stake}_{max} \cdot \text{Total}_{ID}}{\text{growth} + \text{Total}_{ID}}$$

where growth $\in [1, \infty)$ modulates how quickly the required stake grows as a function of the total number of attestations of the validator. Stakemax, as defined in the previous definition, details the maximum amount of stake independent of Level. Level here is as it was previously defined. It indicates a validator's accuracy.

Several modifications to the stake function are proposed. A parameter to adjust the required stake based on the flagging history of the validator, as a parallel to a similar parameter introduced to the reward for the requester. This would incentivize minimizing the amount of flagging that a validator would want to occur, ensuring that they are less likely to provide incorrect attestations (in addition to the traditional penalty). A similar parameter to that associated with the reward function is proposed:

$$w + (1 - w)\frac{\text{flags}}{\text{Total}_{ID}}$$

where $w \in [0, 1]$ as before to determine how much the flagging history should be weighted.

$$\frac{\text{flags}}{\text{Total}_{ID}}$$

is the ratio of flagged attestations to total attestations, therefore having fewer flags historically would reduce the required stake. Another possible tool to determine weight can be based on statistical reliability of the history—a larger number of TotalIDs would give a much more accurate likelihood of flagging than a smaller amount. A Wilson Score Interval, or similar method, could be used to determine the weighting (i.e. w becomes a function of the score interval).

To solve the issue of the pricing of tokens, in some embodiments an additional scaling parameter can be introduced that is a function of the token price and updates across the system every x time units, ensuring everyone is meeting the new minimum stake. This would only work if the price were not volatile. So, in some examples (token) could scale the entire $\text{Stake}_{min}$ function.

The 'Level' part of the stake function can be replaced by a more complex variable which is a function of the level. This can be done if we do not want the stake difference between two different leveled validators to be linear i.e. presently a Level 10,000 validator would pay 10 times more than a Level 1,000 validator, but if Level were replaced by, say, $\sqrt{\text{Level}}$, then the Level 10,000 validator would only pay $\sqrt{10}$ times more.

If all modifications were incorporated into the staking function, with f (token) some variable dependent on the token price (or just f (token)=1 if one chooses not to include it) and g(Level) some variable dependent on the Level of the validator: Let the flag weighting parameter be given by $$FW = \left(w + (1-w)\frac{\text{flags}}{\text{Total}_{ID}}\right)$$

Then $\text{Stake}_{min}$ can be given by $$f(CVC)\left(b + FW \cdot \frac{g(\text{Level}) \cdot \text{Stake}_{max} \cdot \text{Total}_{ID}}{\text{growth} + \text{Total}_{ID}}\right)$$

This satisfies the new feasibility requirements.

Since the alternative stake is not based on the fee, it is difficult to have the penalty to be withdrawn from the stake, to be based on the fee (assuming validators can set any fee they want). The penalty can be overhauled to:

$$Pe = -\min\left(\frac{\text{Fee}}{1 - aP}, \frac{\text{Stake}}{d} + \text{Fee}\right)$$

where $d \in (1, \infty)$ indicates what percentage of the stake should be given as a penalty.

It is now the minimum of the previous penalty and a new possible penalty which is a proportion of the stake. The reward is unchanged as half of the penalty for a correct flag and half of the fee for an incorrect flag. The original penalty was retained and incorporated into a minimum to satisfy some of the constraints of incentives for the game. The penalty could be overhauled to be just a proportion of the stake, but it would be difficult to ensure the right behavior is always incentivized if it was a fixed proportion and the validator could set any fee for transactions.

An alternative to this model is to have the validator penalty differ for rejected and accepted flags. In the case of an accepted flag the penalty is paid out as usual. In the case of a rejected flag, half of the fee goes to the requester but instead of the penalty being lost from the stake, it is locked separately and slowly filtered back into the stake.

Therefore, CF and IF remain identical, and the value of |Pe| is the same but when a flag is rejected, |Pe|

$$-\frac{\text{Fee}}{2}$$

is locked away and 'decays' back into the validator stake at a rate similar to that of the Withdrawal decay function i.e.

Reclaimed Penalty Percentage=$100e^{t-T}$ where T is a parameter specifying how long it will take for 100% of the locked penalty to be reclaimed (e.g. T=5 in the stake withdrawal decay). The problem with this model is that a validator might not care—their stake is locked up regardless and if they know they will get the penalty back eventually they may still reject all flags (they could even reject flags and correct the attestations that they knew were incorrect). This may vary between validators as for some the time-value of the lost token that has been locked up may be significant. For larger validators this is unlikely.

In an identity verification system as disclosed in the present invention, there is a risk that a requester can, for whatever reason, maliciously and continuously flag attestations in order to overwhelm a validator. This would be costly to the requester, as the reward would become negligible and is always less than the fee to request the attestation in the first place. However, it would be significantly more costly to the validator due to the higher penalties imposed on the validator for an incorrect attestation.

The present invention introduces a rate limit on the number of different flags possible. In some examples, the rate limit can be defined as follows:

$$\text{Rate Limit} = \text{base} \times EC$$

$$\text{Rate Limit} = \text{base} \times \frac{Total_{ID}}{Level_{average}}$$

Thus, the requester cannot flag more that 'base' attestations without them being fully processed by the validator. In some examples, the variable 'base' will be adjusted as the system is monitored; a base of 5 may be appropriate to start with. The variable 'base' here should correspond with 'b' in Stakemin.

The validator can deny and pull the flag to prevent multiple requesters from attacking it maliciously. If they do this incorrectly, they will damage their reputation which will act as a deterrent to acting maliciously.

The system must be analyzed to ensure that requesters in the system do not abuse the delayed flag functionality. In some embodiments, a requester can flag that attestation after they have already received the full utility from the attestation. In some embodiments, this problem is solved by having IF decay over time.

In some embodiments, the weighting factor w will be monitored to ensure that validators are not incentivized to continuously reject correct flags and impact the future reward for requesters. If this behavior is discovered in the system, then the weighting factor w can be raised.

The system may accumulate tokens. In some embodiments, the system collects tokens for creating attestations. In some examples the system collects tokens for enabling or administering the attestation blockchain or the marketplace blockchain. Other examples of the system collecting tokens are possible. In some examples, the penalty parameter a will be monitored continuously to ensure penalties are appropriate. The scenario where a commonly sold attestation is incorrect, and several requesters have already issued payment for it may be mitigated by using excess funds. In some embodiments, when an attestation is revoked because of being flagged as incorrect, and past requesters have used and paid for that attestation, then the requesters that have paid for the now revoked attestation are reimbursed the tokens that they paid for that attestation from the system. In some embodiments, the validator that made the revoked attestation is required to reimburse all the requesters that paid for that attestation before it was revoked and had not flagged the attestation as incorrect.

In other embodiments, tokens in the system are used to increasingly incentivize users to join the system or to add applications to the system, in order to increase system utility for all system participants.

Requesters may choose to flag correct attestations after they have extracted full utility from them to claim an additional reward. If an attestation has been sold to many requesters and is subsequently discovered to be incorrect, this could result in the minimum stake being unable to cover the cost of the multiple penalties a validator would be required to payout. In order to solve this problem, in some embodiments, only the flagging requester will receive the payout if the validator accepts the flag and revokes the attestation. However, if the validator chooses to ignore that flag and another requester flags the same attestation, then the validator will have to pay the penalty twice.

Figure 10:
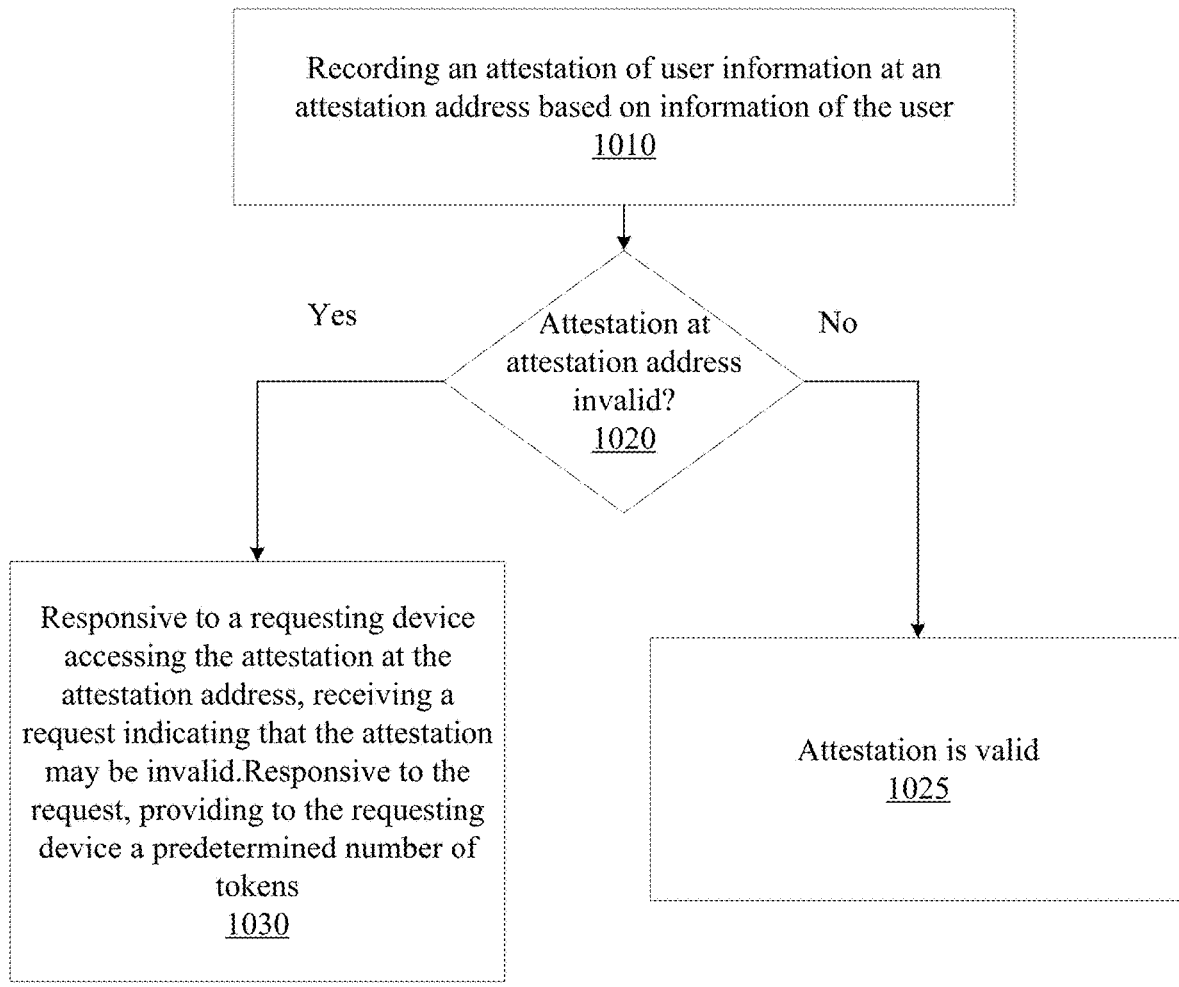
FIG. 10 illustrates one embodiment of a method for feedback-driven attestation of information.

In general overview, FIG. 10 illustrates a method 1000 performed by a validator or a validating device for feedback-driven attestation of information. Method 1000 may include the validator recording an attestation of user information at an attestation address determined based on the information on the user (step 1010). A requester or a requesting device may access the attestation at the attestation address and may send to the validator a request indicating that the attestation may be invalid (step 1020). Responsive to receiving the request indicating that the attestation may be invalid, in step 1030 the validator may provide the requester a predetermined number of tokens. In step 1025 the requester finds that the attestation is valid and the transaction proceeds to completion.

Referring to FIG. 10 in more detail, in some embodiments, a request to the validator from the requester or requesting device indicating that the attestation may be invalid may also be referred to as an indication or a flag from the requester that the attestation may be invalid. The requester may indicate to the validator that the attestation may be invalid using a flag. In some embodiments, the flag may be set by toggling a bit in a message sent by the requester to the validator. In some embodiments, the flag may be set by changing one or more bits at a remote storage location that both the requester and the validator can access. In some embodiments the flag may be set according to rules in a smart contract, such as a smart contract on marketplace blockchain 250.

Figure 11:
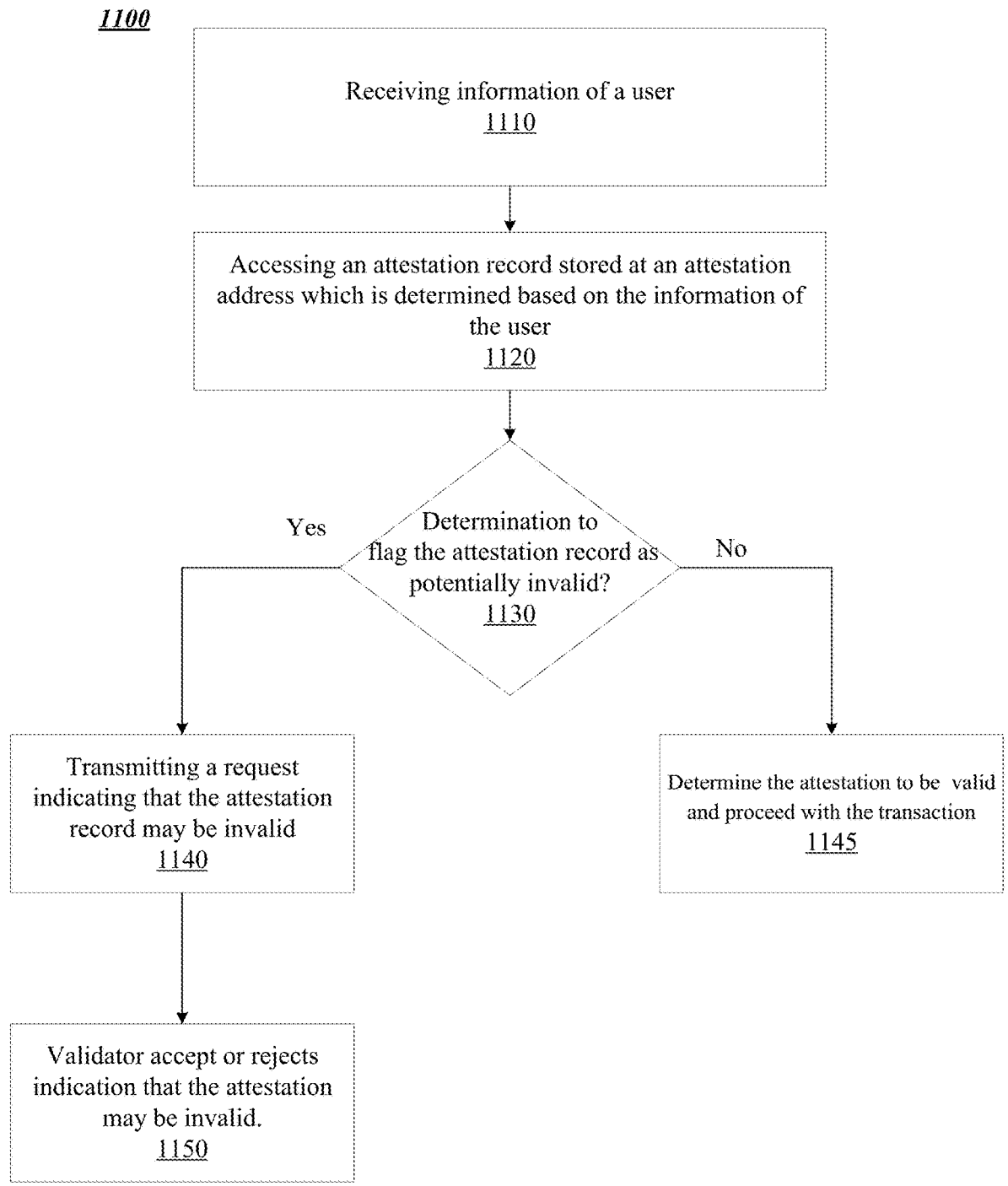
FIG. 11 illustrates one embodiment of another method for feedback-driven attestation of information.

Referring to FIG. 11, In some examples, the requestor receives information from a user (step 1110) who has requested a product or service from the requester for which the requester requires PII from the user to determine whether to provide to the user the product or service. The user may provide to the requester, in addition to the requested PII, information that is required by the requester to create the attestation address for that PII (step 1120). For example, the user may provide to the requester one or more public keys that were used to sign the original attestation creating the attestation address. In some examples, the user may provide to the requester their public key and information about the other signers of the original attestation such that the requester is able to acquire their public keys either directly from the other signers or from, for example, a registry where public keys may be stored. In some embodiments, public keys may be stored in a centralized storage. In some embodiments, the requester may acquire the public key of the validator of the attestation by making a request to the validator when the requester is seeking to verify the attestation, such that the requester can recreate the attestation address from the user PII. In some examples, to recreate the attestation address for the attestation of the user's PII, the requester first creates a hash of the user's PII.

When the requester accesses the attestation on the blockchain, the requester may determine whether or not to flag that attestation as potentially invalid (step 1130) and may transmit to the validator a request indication the determination that the attestation record may be invalid (step 1140). Some circumstances that might lead to the requester flagging the attestation as invalid are fraud (wrongful payment/banking, wrong attested credit score), and identity theft (wrongful personal information). In some examples, the requester may determine the attestation to be valid and proceed with the transaction (step 1145).

In some embodiments the validator may determine whether to accept or reject the indication from the requester that the attestation may be invalid (step 1150). If the validator knows that the attestation is valid, then the validator will reject the indication from the requester that the attestation may be invalid. If the validator knows that the attestation is invalid, then the validator will accept the indication from the requester that the attestation may be invalid. In some embodiments, the validator may determine whether to accept or request the indication from the requester that the attestation may be invalid by accessing the attestation on an attestation blockchain using the attestation address to determine if the attestation has been revoked. If the attestation has been revoked, then the validator may accept the indication from the requester that the attestation may be invalid, and if the attestation has not been revoked, then the validator may reject the indication from the requester that the attestation may be invalid.

In some examples, the requester receives from the validator a predetermined number of tokens. In some embodiments, the number of tokens that the validator provides to the requestor is proportional to a ratio of accepted indications that attestations may be invalid received from the requesting device to a total number of indications that attestations may be invalid received from the requesting device. For example:

$$\text{Number of tokens} \propto \frac{\text{\# of accepted indications/flags from the requester}}{\text{\# of indications/flags from the requester}}$$

In some examples, the number of tokens that the validator provides to the requestor is selected depending on whether the validator accepts the indication or flag received from the requester. For example, in some embodiments, if the validator accepts the indication or flag indicating that the attestation may be invalid, the validator provides more tokens to the requester. In some examples, if the validator rejects the indication or flag indicating that the attestation may be invalid, the validator provides fewer tokens to the requestor.

In some embodiments, when the requester accesses the attestation at the attestation address, the validator receives a predetermined number of tokens from the requester. In some embodiments, the release of the escrow to the validator is coordinated by the user after successfully providing the information.

Figure 12:
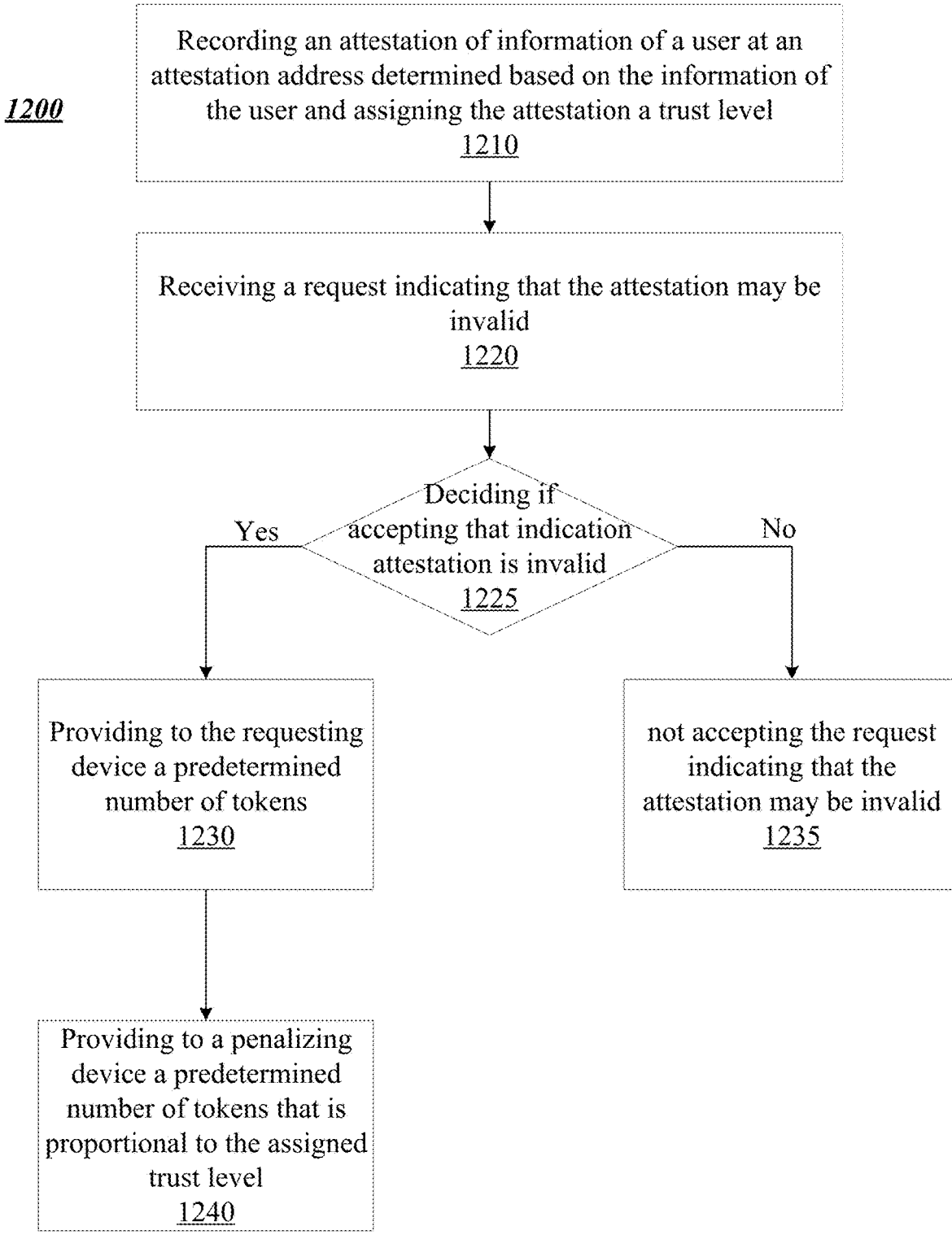
FIG. 12 illustrates one embodiment of a method for utilizing trust levels for attestation of information.

In general overview, FIG. 12 illustrates a method 1200 performed by a validator or a validating device for utilizing trust levels for attestation of information. Method 1200 may include the validator recording an attestation of user information at an attestation address determined based on the information on the user and assigning a trust level proportional to a probability that the attestation is correct (step 1210). The validator may receive a request indicating that the attestation may be invalid (step 1220). In step 1225, the validator may choose whether or not to accept the indication that the attestation may be invalid. Responsive to receiving and accepting the request indicating that the attestation may be invalid, in step 1230 the validator may provide the requester a predetermined number of tokens. In step 1240, the validator may provide to a penalizing device a predetermined number of tokens that is proportional to the assigned trust level. In step 1235, the validator may not accept the request indicating that the attestation may be invalid.

Referring to FIG. 12 in more detail, method 1200 may include the validator recording an attestation of user information at an attestation address determined based on the information on the user and assigning a trust level proportional to a probability that the attestation is correct (step 1210). A validator may validate user PII at different trust levels, for example based on the level of diligence that is performed in the validation process. In some examples, the impact of not correctly validating user PII can have grave consequences, and in some examples, the impact of not correctly validating user PII does not have grave consequences but may be inconvenient. The impact of incorrectly validating user PII depends on the type of attested information. For example, E-Mail/Phone/Address Validation (Contact information) is often less valued then personal/identity information, such as Name/DoB. The application may also be considered in determining the impact. Short-lived attestations, such as invitations or appointments, are often less important than long-lived attestations such as passport information and educational degree. Where the impact of not correctly validating user PII can have grave consequences, a validator may for example utilize more credible sources of information to ensure that the information being attested to is correct. For example, if a validator is validating a user's date of birth and the consequences of not correctly validating the user's date of birth are high (e.g. illegal access to goods or services), the validator may search the user's date of birth across multiple sources. For example, the validator may search one or more federal government databases, for example tax databases or census databases, in addition to one or more state, provincial or municipal databases, for example a voter database, a department of motor vehicles database, a health insurance database, etc. In another example where not correctly validating user PII is less severe, the PII may comprise information such as demographic data used for measuring consumers of a good or an audience for a service. In such cases, a requester may utilize the attestation system in hopes of having correct data, but if data for a small number of users is incorrect, aggregated statistics may still be useful. In such cases, the validator may not necessarily take additional steps to verify user PII, but may note that the PII has a low level of trust. In still other examples, PII may have moderate levels of trust, such as where a validator verifies the PII via publicly accessible (and potentially editable or incorrect) databases, such as deed records, social media profiles, or other such data.

In step 1220, after the requester has accessed the attestation at the attestation address, the validator receives a request from a requester indicating that the attestation may be invalid. Responsive to receiving and accepting the indication (or flag) from the requester, the validator provides to the requester a predetermined number of tokens (step 1230) and provides to a penalizing device a predetermined number of tokens, wherein the number of tokens is selected to be proportional to the trust level assigned to the validator (step 1240). In some embodiments, the number of tokens provided by the validator to the requester is proportional to the probability that the attestation is correct multiplied by the number of tokens that the requester pays to the validator to access the attestation at the attestation address.

In some embodiments, one trust level is assigned to each validator. In some examples, each validator is assigned a trust level (or each validating device is assigned a trust level by the operator of the validating device). Some of the trust levels assigned to the different validators may be different from each other, i.e., not all the validators may have the same trust level. In some examples, a validator may provide validations at different trust levels, and a trust level is assigned to each attestation based on the trust level at which the PII in the attestation was validated. For a validator to provide a more trustworthy attestation of user PII may take greater time, effort and resources to accurately perform. In some embodiments, a requestor may be required to pay more tokens to a validator for an attestation with a higher level of trustworthiness, for example to account for the additional time, effort and resources that the attester may have spent to attest to the information with that level of trustworthiness.

A penalizing device in system 300 may exist to incentivize validators to provide accurate attestations of user PII. In some examples, a validator may create an attestation of user PII and assign that attestation a low trust level based on the time, effort and resources that the validator has invested in validating the PII. In some examples, a validator may create an attestation of user PII and assign that attestation a low trust level based on how reliable the sources of information that the validator relied upon for the attestation are known or considered to be. A validator may create an attestation of user PII and assign that attestation a low trust level based on the historical accuracy of information from a given source that the validator is utilizing to attest to the user PII. In general, a validator may assign an attestation a low trust level based on any attribute of the attestation or of the process used to attest to the information. Where the trust level of the attestation is assigned to be low by the validator, a requester that chooses to utilize this attestation knows a priori that the validator has a lower confidence of its accuracy. In some examples, the requester may pay fewer tokens to the validator for a less trustworthy attestation than for a more trustworthy attestation. In some embodiments, the penalty assessed to a validator by a penalizing device may be higher for an attestation of information that is assigned a higher trust level by the validator, for example because the validator trust level is higher, or in some examples because the process that the validator used to attest to the information was more rigorous.

In some embodiments, the increase in the penalty assessed to the validator by a penalizing device is proportional to the number of tokens that the requesting device utilized to acquire the attestation. In some embodiments, the penalty assessed to the validator by a penalizing device if an attestation provided by the validator is indicated to be invalid by a requester is equal to the price in tokens that the requester sent to the validator in response to the requester accessing the attestation divided by a value inversely proportional to the probability that the attestation is correct. In other words:

$$\text{probability an attestation is correct} = prob_{accuracy}$$

$$\text{trust probability} \propto \frac{1}{prob_{accuracy}}$$

$$\text{price in tokens for an attestation} = price_{attestation}$$

$$\text{assessed validator penalty for a flagged attestation} = \frac{price_{attestation}}{\text{trust probability}}$$

In some embodiments, the trust probability as defined above may also be expressed as:

$$\text{trust probability} = 1 - prob_{accuracy} \times w$$

where w is a weighting coefficient. In some examples, the weighting coefficient may be determined by the penalizing device.

In a general overview, FIG. 13 illustrates a method 1300 for invalidating attestation of information. Method 1300 may include a validating device or a validator recording an attestation of information of a user at an attestation address within a distributed or centralized ledger, the attestation address determined based on information of the user, and the validator assigned a trust level (for example by the operator of the validator device) proportional to a probability that the attestation is correct (step 1310). Method 1300 may include the validator receiving a predetermined number of tokens from each of a plurality or requesters responsive to the requesting device of the requester access the attestation at the attestation address (step 1320). After a requester accesses the attestation at the attestation address, the validating device of the validator may subsequently receive from the requestor or from a plurality of requestors a request indicating that the attestation may be invalid, for example a flag indicating that the attestation may be invalid (step 1330). Upon receiving the indication from the requestor or requestors that the attestation may be invalid, the validator may provide to the requester a different predetermined number of tokens which is less than the number of tokens that the requester provided to the validator to access the attestation at the attestation address that is proportional to the number of flagging requestors (step 1340). To the other requesting devices of requesters that are not the requester that indicated or flagged that the attestation may be invalid, the validating device may provide a portion of a number of predetermined tokens, where the predetermined number of tokens was selected in a manner that is proportional to the trust level assigned to the validating device, for example by the validator or proportional to the number of other requesting devices (step 1350). In some embodiments, if there is only one requesting device that flags an attestation, they receive the entire penalty.

Referring to FIG. 13 in more detail, in some embodiments the portions of the predetermined number of tokens that the validator provides to each of the other requesters that are not the requester that indicated or flagged that the attestation may be invalid comprises a predetermined penalty number of tokens minus the number of tokens that the validating device provided to the requester that indicated or flagged that the attestation may be invalid divided by the number of requestors other than the requester that indicated or flagged that the attestation may be invalid. In other words, if the validator receives an indication that an attestation that the validator attested to may be invalid, then of the penalty number of tokens, the validator provides a portion of these tokens to the requestor that flagged the attestation as potentially invalid, and divides the remainder of the tokens evenly amongst the other requestors that accessed the flagged attestation. In some embodiments, the penalty number of tokens is at least ten times the number of tokens that a requester provides to a validator for an attestation of a user's PII.

In some embodiments, the predetermined penalty number of tokens is equal to the number of tokens that a requester provides to the validator to access the attestation divided by a value that is inversely proportional to the probability that the attestation is correct. For example, if the attestation is less probable to be correct than the penalty number of tokens is less than if the attestation is more probably to be correct.

In some embodiments, the validating device (or the validator) records the invalidity of the attestation at the attestation address within the distributed or centralized ledger when it receives an indication from a requester that the attestation may be invalid, for example as may be signaled by spending the transaction or by changing the flag in a smart contract.

In a general overview, FIG. 14 illustrates a method 1400 for providing security of attestation information. Method 1400 may include the validating device or the validator recording one or more attestations of information of users at attestation addresses determined based on the information of the users, each attestation assigned a trust level proportional to the probability that the attestation is correct (step 1410). Method 1400 may include the validator device or the validator determining a stake value based on a number of recorded attestations and an average trust level of the recorded attestations (step 1420). Method 1400 may include determining if the stake value is above or equal to a certain threshold in step 1425. Method 1400 may also include the validator device providing to a second device a number of tokens equal to at least the determined stake value (step 1430). Method 1400 may also include not continuing with the interaction if the stake value is below a certain threshold (step 1440).

Referring to FIG. 14 in more detail, the stake value may be calculated as a predetermined number of tokens multiplied by a function of a base coefficient, the number of recorded attestations, a growth coefficient, and the average trust level of the recorded attestations. In some examples, the growth coefficient is a denominator of the function and limits the stake value as the number of recorded attestations increases. In some embodiments, the validating device may receive from multiple requesting devices a predetermined number of tokens when the requesting devices access an attestation recorded by the validating device, and the stake value is proportional to the predetermined number of tokens.

In some examples, if the validating device receives an indication that an attestation of PII of a user may be invalid after a requesting device accesses the attestation of PII at the attestation address determined based on the PII of the user, then the validating device provides via a second device a predetermined number of tokens from the number of tokens equal to at least the determined stake value. In some embodiments, other requesting devices that have previously accessed this attestation of the user PII are provided are provided a number of tokens from the number of tokens which no less than the determined stake value in response to a different requester indicating to the validator that the attestation of the user PII may be invalid. In some examples, the number of tokens that are provided via a second device to the requester of the attestation that flagged that attestation as possibly invalid is proportional to the trust level that was assigned to the attestation. The validator may record the invalidity of the attestation at the attestation address when the validator receives an indication from a requester that the attestation may be invalid.

In some embodiments, the validating device may request from the requesting device withdrawal of the number of tokens (the number of tokens not less than the determined stake value) provided by the validating device to the requesting device in response to the requesting device flagging that an attestation may be invalid. The validator device may periodically receive from the requester a percentage of the number of tokens, where the percentage of the tokens is determined as an exponential function from an elapsed time from the withdrawal request.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method for utilizing trust levels for attestation of information, comprising:
    deriving, by a validating device, an attestation address within a distributed or centralized ledger from information of a user;
    recording, by the validating device in the distributed or centralized ledger, an attestation of the information of the user with a transaction at the derived attestation address, the validating device assigned a trust level proportional to a probability that the attestation is correct by an operator of the validating device;
    receiving, by the validating device from a requesting device responsive to the requesting device accessing the transaction at the attestation address, a request indicating that the attestation may be invalid;

providing, by the validating device to the requesting device responsive to the request, a first predetermined number of tokens;

providing, by the validating device to a penalizing device, a second predetermined number of tokens, the second predetermined number of tokens selected proportional to the trust level assigned to the validating device; and receiving a third predetermined number of tokens, by the validating device from the requesting device, responsive to the requesting device accessing the transaction at the attestation address; and wherein the second predetermined number of tokens is equal to the third predetermined number of tokens divided by a value inversely proportional to the probability that the attestation is correct.

2. The method of claim 1, wherein the third predetermined number of tokens is less than the second predetermined number of tokens.

3. The method of claim 1, wherein the value inversely proportional to the probability that the attestation is correct comprises a difference between one and the probability that the attestation is correct multiplied by a weighting coefficient.

4. The method of claim 3, wherein the weighting coefficient is determined by the penalizing device.

5. The method of claim 1, wherein the first predetermined number of tokens is proportional to the probability that the attestation is correct multiplied by the third predetermined number of tokens.

6. The method of claim 1, wherein the validating device is a first validating device of a plurality of validating devices, each validating device assigned a trust level by an operator of the corresponding validating device, and wherein a plurality of the assigned trust levels are different.

7. A system for utilizing trust levels for attestation of information, comprising:

a validating device in communication with a system maintaining a distributed or centralized ledger and a requesting device, the validating device comprising a processor configured to:

record an attestation of information of a user with a transaction at an attestation address within the distributed or centralized ledger derived based on the information of the user, the validating device assigned a trust level proportional to a probability that the attestation is correct by an operator of the validating device;

receive, from the requesting device responsive to the requesting device accessing the transaction at the attestation address, a request indicating that the attestation may be invalid;

provide, to the requesting device responsive to the request, a first predetermined number of tokens;

provide, to a penalizing device, a second predetermined number of tokens, the second predetermined number of tokens selected proportional to the trust level assigned to the validating device; and receive a third predetermined number of tokens, from the requesting device, responsive to the requesting device accessing the transaction at the attestation address, wherein the second predetermined number of tokens is equal to the third predetermined number of tokens divided by a value inversely proportional to the probability that the attestation is correct.

8. The system of claim 7, wherein the third predetermined number of tokens is less than the second predetermined number of tokens.

9. The system of claim 7, wherein the value inversely proportional to the probability that the attestation is correct comprises a difference between one and the probability that the attestation is correct multiplied by a weighting coefficient.

10. The system of claim 9, wherein the weighting coefficient is determined by the penalizing device.

11. The system of claim 7, wherein the first predetermined number of tokens is proportional to the probability that the attestation is correct multiplied by the third predetermined number of tokens.

12. The system of claim 7, wherein the validating device is a first validating device of a plurality of validating devices, each validating device assigned a trust level by an operator of the corresponding validating device, and wherein a plurality of the assigned trust levels are different.

13. A non-transitory computer readable medium comprising instructions that, when executed by a processor of a computing system, cause the computing system to:

record an attestation of information of a user with a transaction at an attestation address within a distributed or centralized ledger derived based on the information of the user, the computing system assigned a trust level proportional to a probability that the attestation is correct by an operator of the computing system;

receive, from a requesting device responsive to the requesting device accessing the transaction at the attestation address, a request indicating that the attestation may be invalid;

provide, to the requesting device responsive to the request, a first predetermined number of tokens;

provide, to a penalizing device, a second predetermined number of tokens, the second predetermined number of tokens selected proportional to the trust level assigned to the validating device; and receive a third predetermined number of tokens, from the requesting device, responsive to the requesting device accessing the transaction at the attestation address, wherein the second predetermined number of tokens is equal to the third predetermined number of tokens divided by a value inversely proportional to the probability that the attestation is correct.

14. The computer-readable medium of claim 13, wherein the second predetermined number of tokens is equal to the third predetermined number of tokens divided by a value inversely proportional to the probability that the attestation is correct.

* * * * *